United States Patent
VanDerWege et al.

(10) Patent No.: US 11,319,866 B1
(45) Date of Patent: May 3, 2022

(54) SYSTEMS AND METHODS FOR ACTIVE PRE-CHAMBER IGNITION

(71) Applicant: Ford Global Technologies, LLC, Dearborn, MI (US)

(72) Inventors: Brad VanDerWege, Plymouth, MI (US); Claudia Iyer, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/303,563

(22) Filed: Jun. 2, 2021

(51) Int. Cl.
| | |
|---|---|
| *F02B 19/12* | (2006.01) |
| *F02M 61/14* | (2006.01) |
| *F02M 23/00* | (2006.01) |
| *F02B 19/18* | (2006.01) |

(52) U.S. Cl.
CPC .............. *F02B 19/12* (2013.01); *F02B 19/18* (2013.01); *F02M 23/00* (2013.01); *F02M 61/14* (2013.01)

(58) Field of Classification Search
CPC ......... F02B 19/12; F02B 19/18; F02M 23/00; F02M 61/14
See application file for complete search history.

(56) References Cited

U.S. PATENT DOCUMENTS

| | | | | |
|---|---|---|---|---|
| 3,220,389 | A | * | 11/1965 | Van Rinsum ........... F02B 19/14 123/268 |
| 3,890,940 | A | * | 6/1975 | List ........................ F02B 23/04 123/293 |
| 4,060,058 | A | | 11/1977 | Hideg et al. |
| 4,433,659 | A | * | 2/1984 | Burgio .................... F02B 19/14 123/256 |
| 5,203,298 | A | | 4/1993 | Manolis |
| 5,222,993 | A | * | 6/1993 | Crane ................ F02M 21/0272 123/256 |
| 9,593,633 | B1 | | 3/2017 | Kim |
| 9,765,682 | B2 | * | 9/2017 | Chiera .................... H01T 13/54 |
| 9,840,963 | B2 | * | 12/2017 | Chiera .................... F02B 19/12 |
| 10,066,580 | B2 | | 9/2018 | Assanis et al. |
| 10,161,296 | B2 | | 12/2018 | Schock et al. |
| 2014/0083391 | A1 | * | 3/2014 | Gruber .................... F02B 19/16 123/260 |
| 2018/0363539 | A1 | * | 12/2018 | Shelby .................. F02B 19/108 |

FOREIGN PATENT DOCUMENTS

| | | |
|---|---|---|
| CN | 106014694 A | 10/2016 |
| DE | 102019101435 A1 | 9/2019 |

* cited by examiner

*Primary Examiner* — Xiao En Mo
(74) *Attorney, Agent, or Firm* — Geoffrey Brumbaugh; McCoy Russell LLP

(57) ABSTRACT

Systems and methods are provided for air and fuel delivery within a pre-chamber. In one example, an engine pre-combustion chamber comprises a first chamber portion centered along a first axis, and a second chamber portion joined to the first chamber portion and centered along a second axis arranged at an angle to the first axis. In this way, wall wetting may be decreased while favorable charge motion for robust ignition may be increased.

17 Claims, 9 Drawing Sheets

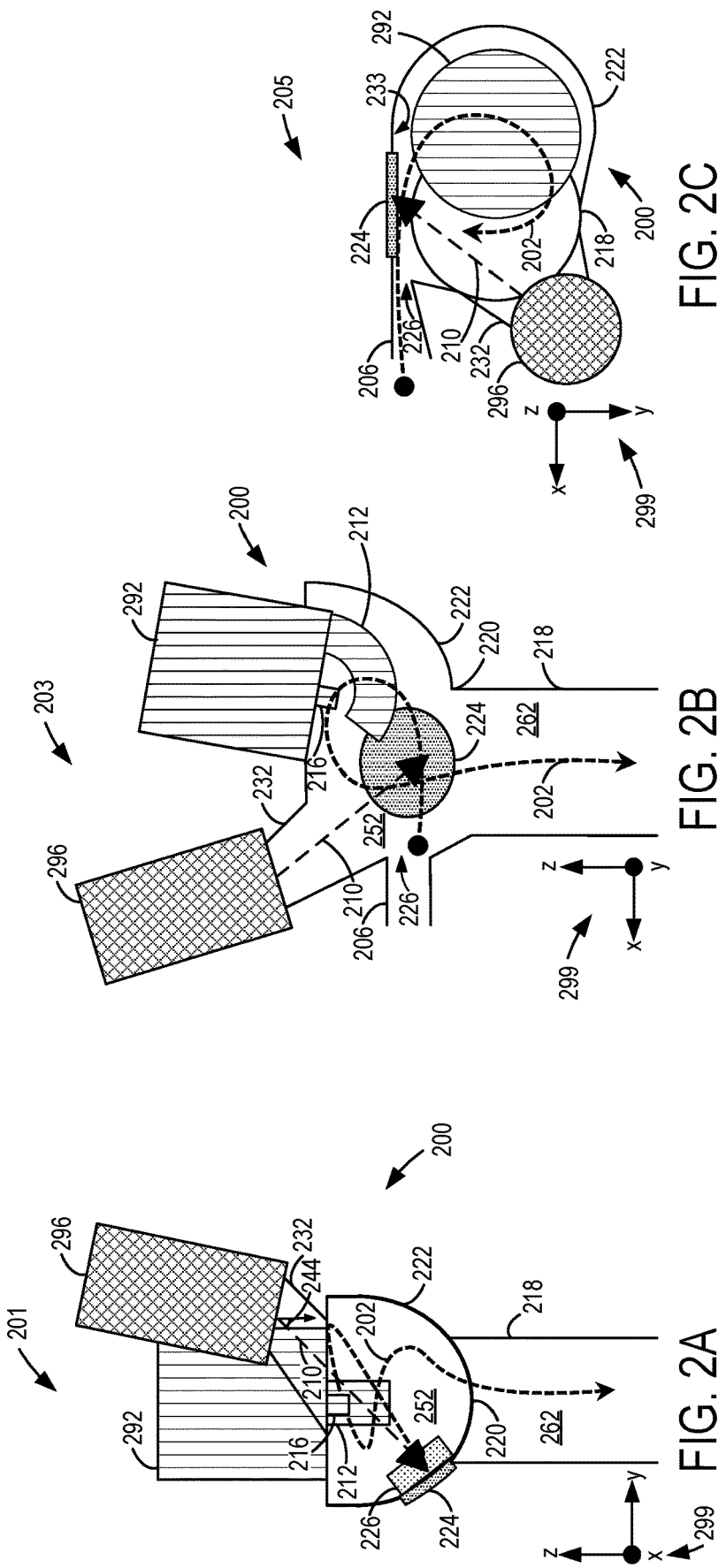

SYSTEMS AND METHODS FOR ACTIVE PRE-CHAMBER IGNITION

FIELD

The present description relates generally to methods and systems for engines having an active pre-chamber ignition system.

BACKGROUND/SUMMARY

An internal combustion engine combusts an air-fuel mixture within cylinders to produce torque, which may be used to propel a vehicle. In some such engines, an ignition source is used to ignite the air-fuel mixture within each cylinder during a compression stroke. For example, in traditional spark-ignition engines, each cylinder includes a spark plug for directly igniting the air-fuel mixture within the cylinder. In other examples, the air-fuel mixture within the cylinder may be ignited by jets of hot gas and flame from a pre-combustion chamber, referred to herein as a "pre-chamber." The pre-chamber may be a walled chamber located in the clearance volume of the cylinder, and may include a spark plug, an oxygen or air injector, and a fuel injector. During engine operation, a first air-fuel mixture is introduced into the pre-chamber, and a second air-fuel mixture is introduced into the cylinder, also referred to herein as a "main chamber." When ignition is requested, the spark plug in the pre-chamber is actuated, igniting the first air-fuel mixture. As the first air-fuel mixture combusts, jets of flame and hot gas may exit the pre-chamber and enter the cylinder via one or more holes in the pre-chamber walls. These jets ignite the second air-fuel mixture in the cylinder to produce torque.

Pre-chamber ignition may offer performance and efficiency increases over a traditional spark-ignition engine during certain operating conditions. For example, a cylinder with pre-chamber ignition may operate with a higher (e.g., leaner) air-fuel ratio (AFR) and/or more exhaust gas recirculation (EGR) than a similar cylinder of a traditional spark-ignition engine, which may lead to lower fuel consumption in the cylinder with pre-chamber ignition. In other examples, a cylinder with pre-chamber ignition may produce more power than a cylinder ignited directly by a spark plug due to an increased burn rate in the cylinder, which may reduce an amount of time for knocking combustion to occur and thereby allow ignition timing to be advanced further toward maximum brake torque (MBT).

However, the small size of a pre-chamber may reduce mixing of fuel and air in an active system having direct fuel and air injection. For example, the relatively small fuel amount used for pre-chamber ignition means that only a single fuel injection is likely to be used, rather than the plurality of fuel injections that may be used for direct injection in the main chamber. Further, because of the small size of the pre-chamber, the fuel injection may hit a pre-chamber wall after traveling a short distance, which may increase surface wetting. In addition, residual purging may reduce an inflow of gases from the main chamber during the compression stroke, thereby reducing charge motion in the pre-chamber. However, purging may be used to keep residual content in the pre-chamber lower than the main chamber (e.g., for high EGR operation in the main chamber) in order to reduce a likelihood of pre-chamber misfire, which would subsequently result in cylinder misfire.

Other attempts to address air and fuel mixing within the pre-chamber include pre-mixing the air and fuel before injecting it into the pre-chamber. One example approach is shown in CN 106,014,694 B. Therein, an air-assisted fuel injector coupled to a pre-chamber includes a fuel pipeline with a fuel control valve and a compressed air pipe with an air control valve. The air assisted fuel injector may direct an air-fuel mixture into the pre-chamber for combustion via an ignition spark from a spark plug in the pre-chamber.

However, the inventors herein have recognized potential issues with such systems. As one example, injecting the air and fuel via a single injector may reduce an amount of control over fuel evaporation and charge motion. As another example, the air-assisted fuel injector may have more complicated control, as the air control valve, the fuel control valve, and the air-assisted fuel injector may all have different opening timings and durations.

In one example, the issues described above may be addressed by an engine pre-combustion chamber, comprising a first chamber portion centered along a first axis, and a second chamber portion joined to the first chamber portion and centered along a second axis that is arranged at an angle to the first axis. In this way, the relative arrangement of the first chamber portion and the second chamber portion may facilitate fuel evaporation and charge motion for increased air and fuel mixing without complicating injection control.

As one example, the second chamber portion may include a cylindrical upper portion capped by a hemispherical lower portion, and the hemispherical lower portion may include a plurality of openings arranged radially with respect to the second axis. The plurality of openings may fluidically couple an internal volume of the engine pre-combustion chamber to an exterior of the engine pre-combustion chamber, such as to a main combustion chamber of a cylinder. As another example, a sidewall of the first chamber portion may be joined to the second chamber portion by a curved joint, and wherein the first chamber portion is fluidically coupled to the second chamber portion at the curved joint. Further, a first length of the first chamber portion in a direction of the first axis may be less than a second length of the cylindrical upper portion of the second chamber portion in a direction of the second axis, and a first width of the first chamber portion, perpendicular to the first axis, may be greater than a second width of the cylindrical upper portion, perpendicular to the second axis. As such, the first chamber portion may be wider and shorter than the second chamber portion.

As another example, the first chamber portion may include an upper surface that is shaped to receive a spark plug and a side extension that is shaped to couple a fuel injector, the side extension angled with respect to the first axis to direct fuel diagonally across the first chamber portion toward an impingement area at an inner surface of the sidewall proximate to the curved joint. Further, the pre-combustion chamber may further include an air passage coupled to the first chamber portion at an opening in the sidewall proximate to the impingement area. The air passage may be shaped to couple an air injector at an opposite end of the air passage to the opening. Further still, in some examples, the first chamber portion may include a channel that extends radially outward with respect to the first axis around a portion of a perimeter of the first chamber portion. The channel may arc toward the upper surface of the first chamber portion and away from the second chamber portion between an inlet that proximate to the opening in the sidewall of the first chamber portion and an outlet of the channel.

In this way, swirl motion may be generated in the first chamber portion when air is delivered via the air passage. Further, the channel may further direct the air toward the spark plug. Further still, the air may pass through the impingement area, increasing fuel evaporation and decreasing fuel film formation on the sidewall. As a result, robust pre-chamber ignition may be provided, thus decreasing an occurrence of cylinder misfire.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A schematically shows a cross-sectional front view of an exemplary active pre-chamber including a plurality of chamber portions.

FIG. 2B schematically shows a cross-sectional side view of the pre-chamber of FIG. 2A.

FIG. 2C schematically shows a cross-sectional top view of the pre-chamber of FIG. 2A.

FIGS. 3A-3E are shown approximately to scale.

DETAILED DESCRIPTION

Figure 1:
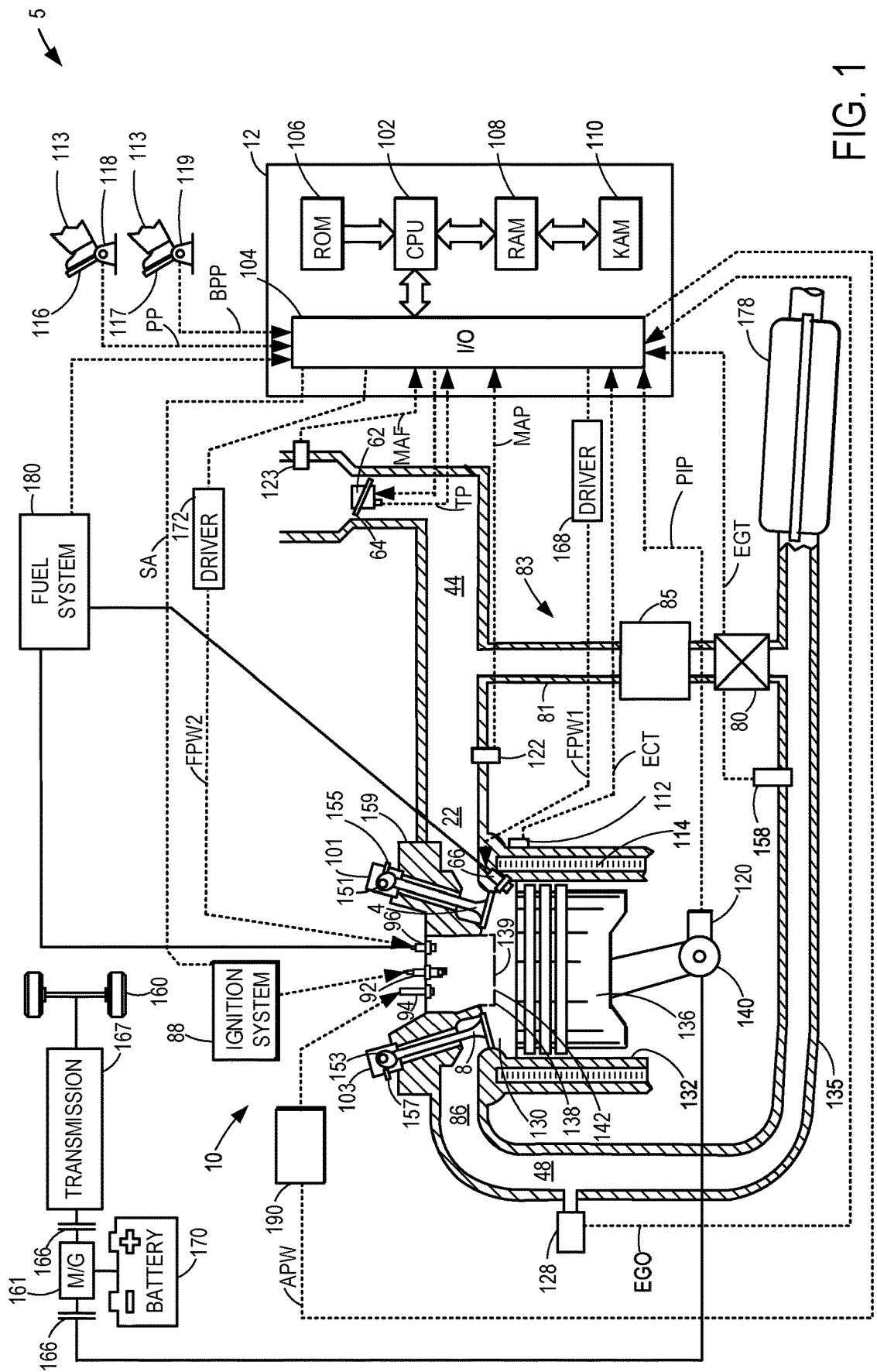
FIG. 1 shows a schematic depiction of a cylinder including an active pre-chamber in an engine of a vehicle system.

The following description relates to systems and methods for a pre-chamber having active fuel and air injection. FIG. 1 shows an engine having an active pre-chamber coupled within a clearance volume of a cylinder of the engine. In particular, the pre-chamber includes a fuel injector, a spark plug, and an air injector having a spatial arrangement depicted in FIGS. 3A-3E. A geometry of the pre-chamber and the spatial arrangement of the fuel injector, the spark plug, and the air injector may promote charge motion and fuel evaporation, such as schematically shown in FIGS. 2A-2C. For example, a fuel spray may be directed diagonally across an upper portion of the pre-chamber, such as illustrated in FIGS. 2A-3E, and purge air may be directed around the upper portion of the pre-chamber and across a surface where the fuel spray would impinge, such as particularly illustrated in FIGS. 2A-2C. For example, an electronic controller may control fuel injection and air injection timings according to the method shown in FIG. 4 so that the purge air is flowing into the pre-chamber while the fuel injection occurs, thus promoting mixing of the air and fuel and decrease surface wetting. An example timing chart of such fuel injection and air injections timings with respect to a four-stroke combustion cycle is shown in FIG. 5, which also includes cylinder fuel injection and spark plug actuation timings. In this way, charge motion and mixing in the pre-chamber may be increased for robust cylinder ignition, even while the cylinder is operated at a relatively high dilution.

Turning now to the figures, FIG. 1 shows a partial view of a single cylinder 130 of an internal combustion engine 10 that may be included in a vehicle 5. Internal combustion engine 10 may be a multi-cylinder engine. Cylinder (e.g., combustion chamber) 130 includes a coolant sleeve 114 and cylinder walls 132, with a piston 136 positioned therein and connected to a crankshaft 140. Combustion chamber 130 is shown communicating with an intake manifold 44 via an intake valve 4 and an intake port 22 and with an exhaust manifold 48 via an exhaust valve 8 and an exhaust port 86. A throttle 62 including a throttle plate 64 may be provided in an intake passage upstream of intake manifold 44 for varying a flow rate and/or pressure of intake air provided to the engine cylinders.

An exhaust passage 135 can receive exhaust gases from other cylinders of engine 10 in addition to cylinder 130. An exhaust gas sensor 128 is shown coupled to exhaust passage 135 upstream of an emission control device 178. Exhaust gas sensor 128 may be selected from among various suitable sensors for providing an indication of an exhaust gas air-fuel ratio (AFR), such as a linear oxygen sensor or UEGO (universal or wide-range exhaust gas oxygen), a two-state oxygen sensor or EGO (as depicted), a HEGO (heated EGO), a NOx sensor, a HC sensor, or a CO sensor, for example. Emission control device 178 may be a three-way catalyst, a NOx trap, various other emission control devices, or combinations thereof.

External exhaust gas recirculation (EGR) may be provided to the engine via a high pressure EGR system 83, delivering exhaust gas from a zone of higher pressure in exhaust passage 135 to a zone of lower pressure in intake manifold 44, downstream of throttle 62, via an EGR passage 81. An amount EGR provided to intake manifold 44 may be varied by controller 12 via an EGR valve 80. For example, controller 12 may be configured to actuate and adjust a position of EGR valve 80 to adjust the amount of exhaust gas flowing through EGR passage 81. EGR valve 80 may be adjusted between a fully closed position, in which exhaust gas flow through EGR passage 81 is blocked, and a fully open position, in which exhaust gas flow through the EGR passage is enabled. As an example, EGR valve 80 may be continuously variable between the fully closed position and the fully open position. As such, the controller may increase a degree of opening of EGR valve 80 to increase an amount of EGR provided to intake manifold 44 and decrease the degree of opening of EGR valve 80 to decrease the amount of EGR provided to intake manifold 44. As an example, EGR valve 80 may be an electronically activated solenoid valve. In other examples, EGR valve 80 may be positioned by an incorporated stepper motor, which may be actuated by controller 12 to adjust the position of EGR valve 80 through a range of discreet steps (e.g., 52 steps), or EGR valve 80 may be another type of flow control valve. Further, EGR may be cooled via passing through EGR cooler 85 within EGR passage 81. EGR cooler 85 may reject heat from the EGR gases to engine coolant, for example. Although EGR system 83 is shown as a high pressure EGR system, in other examples, vehicle 5 may additionally or alternatively include a low pressure EGR system, where exhaust gas is provided from exhaust passage 135 downstream of a turbine of a turbocharger and delivered to an intake passage upstream of a compressor of the turbocharger.

Under some conditions, the EGR system may be used to regulate a temperature of the air and fuel mixture within the combustion chamber. Further, EGR may be desired to attain a desired engine dilution, thereby increasing fuel efficiency and emissions quality, such as emissions of nitrogen oxides. As an example, EGR may be requested at low-to-mid engine loads. Thus, it may be desirable to measure or estimate the EGR mass flow. EGR sensors may be arranged within EGR passage 81 and may provide an indication of one or more of mass flow, pressure, and temperature of the exhaust gas, for example. Additionally, EGR may be desired after emission control device 178 has attained its light-off temperature. An amount of EGR requested may be based on engine operating conditions, including engine load (as estimated via pedal position sensor 134), engine speed (as estimated via a crankshaft acceleration sensor), engine temperature (as estimated via an engine coolant temperature sensor), etc. For example, controller 12 may refer to a look-up table having the engine speed and load as the input and output a desired amount of EGR corresponding to the input engine speed-load. In another example, controller 12 may determine the desired amount of EGR (e.g., desired EGR flow rate) through logic rules that directly take into account parameters such as engine load, engine speed, engine temperature, etc. In still other examples, controller 12 may rely on a model that correlates a change in engine load with a change in a dilution requirement, and further correlates the change in the dilution requirement with a change in the amount of EGR requested. For example, as the engine load increases from a low load to a mid load, the amount of EGR requested may increase, and then as the engine load increases from a mid load to a high load, the amount of EGR requested may decrease. Controller 12 may further determine the amount of EGR requested by taking into account a best fuel economy mapping for a desired dilution rate. After determining the amount of EGR requested, controller 12 may refer to a look-up table having the requested amount of EGR as the input and a signal corresponding to a degree of opening to apply to the EGR valve (e.g., as sent to the stepper motor or other valve actuation device) as the output.

In the depicted view, intake valve 4 and exhaust valve 8 are located at an upper region of combustion chamber 130. Intake valve 4 and exhaust valve 8 may be controlled by a controller 12 using respective cam actuation systems including one or more cams. The cam actuation systems may utilize one or more of variable displacement engine (VDE), cam profile switching (CPS), variable cam timing (VCT), variable valve timing (VVT), and/or variable valve lift (VVL) systems to vary valve operation. In the depicted example, intake valve 4 is controlled by an intake cam 151, and exhaust valve 8 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system. The various valve control systems may be used to vary a timing, open duration, and lift of intake valve 4 and exhaust valve 8.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock. In other examples, engine 10 may be operated with Miller or Atkinson cycles, which use valve timing to make the effective ratio lower than the mechanical compression ratio.

As a non-limiting example, cylinder 130 is shown including a cylinder fuel injector 66. Fuel injector 66 is shown coupled directly to combustion chamber 130 for injecting fuel directly therein in proportion to a pulse-width of a signal FPW1 received from controller 12 via an electronic driver 168. In this manner, fuel injector 66 provides what is known as direct injection (hereafter also referred to as "DI") of fuel into cylinder 130. In another example, fuel injector 66 may be a port injector providing fuel into the intake port upstream of cylinder 130. Further, while FIG. 1 shows fuel injected to the cylinder via a single injector, the engine may alternatively be operated by injecting fuel via multiple injectors, such as one direct injector and one port injector. For example, both port and direct injectors may be included in a configuration that is known as port fuel and direct injection (PFDI). In such a configuration, controller 12 may vary a relative amount of injection from each injector.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In this way, air and fuel are delivered to cylinder 130, which may produce a combustible air-fuel mixture.

Fuel may be delivered by fuel injector 66 to cylinder 130 during a single cycle of the cylinder. Further, the distribution and/or relative amount of fuel delivered from cylinder fuel injector 66 may vary with operating conditions. Furthermore, for a single combustion event, multiple injections of the delivered fuel may be performed per cycle. The multiple injections may be performed during the compression stroke, intake stroke, or any appropriate combination thereof.

In the example shown in FIG. 1, each cylinder 130 of engine 10 includes a pre-chamber 138 for initiating combustion. Pre-chamber 138 is coupled within a cylinder head 159 of cylinder 130. Pre-chamber 138 is defined by pre-chamber walls 139 and includes a spark plug 92, an air injector 94, and a pre-chamber fuel injector 96. An example three-dimensional configuration of pre-chamber 138 that promotes air and fuel mixing will be described below with respect to FIGS. 3A-3E. Air injector 94 is shown directly coupled to pre-chamber 138 for injecting air and/or oxygen into the pre-chamber. In some examples, air injector 94 is an electromagnetic (e.g., solenoid) injector. One or more of ambient air, oxygen, and another combustible gas may be delivered to air injector 94 from a pre-chamber air source 190. In some examples, air injector 94 is an electromagnetic (e.g., solenoid) injector, and may inject air and/or $O_2$ in proportion to a pulse-width of a signal APW received from controller 12 via pre-chamber air source 190. Note that in relation to pre-chamber air source 190, the term "air" may refer herein to ambient air, pure oxygen (e.g., $O_2$), hydrogen (e.g., $H_2$), or a mixture of such gases. In some examples, the pre-chamber air source 190 supplies air injector 94 with ambient air from an air intake passage of the engine, which may be stored in a pressurized tank before injection. In other examples, pre-chamber air source 190 supplies air injector 94 with onboard-generated $O_2$, which may be stored in a pressurized tank before injection. For example, pre-chamber air source 190 may be maintained at a desired pressure by an associated pump, compressor, or fan. A pressure differential between pre-chamber air source 190 and pre-chamber 138 and an open time of air injector 94 (e.g., as determined by the pulse-width of the signal APW) may determine the mass of air delivered to pre-chamber 138, for example.

Pre-chamber fuel injector 96 is shown coupled directly to pre-chamber 138 for injecting fuel directly therein in proportion to a pulse-width of a signal FPW2 received from controller 12 via an electronic driver 172. Fuel may be provided to pre-chamber fuel injector 96 by high-pressure fuel system 180, described above. Alternatively, fuel may be provided to pre-chamber fuel injector 96 from a dedicated pre-chamber fuel system that may be included within or distinct from high-pressure fuel system 180. Thus, both air and fuel are delivered to pre-chamber 138, which may produce an air-fuel mixture with an air-fuel ratio (AFR) that may differ from an AFR in cylinder 130. In one example, the AFR in pre-chamber 138 may be richer (e.g., have a higher proportion of fuel) than the AFR in cylinder 130. In another example, the AFR in the pre-chamber may be the same as the AFR in the cylinder. In yet another example, the AFR in pre-chamber 138 may be leaner (e.g., have a higher proportion of air) than the AFR in cylinder 130.

Further, the pre-chamber walls 139 may include a plurality of openings (e.g., orifices), such as an opening 142 shown in FIG. 1. Opening 142 provides an orifice between pre-chamber 138 and cylinder 130, fluidically coupling an interior of pre-chamber 138 to an interior of cylinder 130. As such, during some conditions, gases may flow between the interior of pre-chamber 138 and the interior of cylinder 130. For example, gases (e.g., air, fuel, and/or residual combustion gases) may flow through opening 142 with a directionality and rate based on a pressure difference across opening 142 (e.g., between the interior of pre-chamber 138 and the interior of cylinder 130). Opening 142 (along with any other openings in pre-chamber walls 139) may also provide an ignition flame from pre-chamber 138 to cylinder 130, as will be elaborated below.

An ignition system 88 may provide an ignition spark to pre-chamber 138 via spark plug 92 in response to a spark advance signal SA from controller 12, under select operating modes. A timing of signal SA may be adjusted based on engine operating conditions and a driver torque demand. For example, spark may be provided at maximum brake torque (MBT) timing to maximize engine power and efficiency. Controller 12 may input engine operating conditions, including engine speed, engine load, and exhaust gas AFR, into a look-up table, which may output the corresponding MBT timing for the input engine operating conditions. In other examples, spark may be retarded from MBT to prevent an occurrence of knock. In still other examples, spark may be retarded from MBT to reduce engine torque, such as due to a decrease in driver-demanded torque or a transmission gear shift event. When spark plug 92 provides the ignition spark to pre-chamber 138, the air-fuel mixture within the pre-chamber may combust, the increased pressure of combustion sending jets of flame into cylinder 130 via the plurality of openings in the pre-chamber walls 139, including opening 142. The plurality of openings may be arranged such that the jets of flame are evenly distributed in cylinder 130. The jets of flame may ignite the air-fuel mixture in cylinder 130, causing combustion. After combustion, a mixture of exhaust gases from both pre-chamber 138 and cylinder 130 may be exhausted from cylinder 130 to exhaust manifold 48 via opening of exhaust valve 8.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read-only memory 106 in this particular example, random access memory 108, keep alive memory 110, and a data bus. Storage medium read-only memory 106 can be programmed with computer readable data representing instructions executable by microprocessor unit 102 for performing the methods and routines described herein as well as other variants that are anticipated but not specifically listed.

Controller 12 may receive various signals from sensors coupled to engine 10, in addition to those signals previously discussed, including a measurement of inducted mass air flow (MAF) from a mass air flow sensor 123, an engine coolant temperature signal (ECT) from a temperature sensor 112 coupled to coolant sleeve 114, signal EGO from exhaust gas sensor 128, which may be used by controller 12 to determine the AFR of the exhaust gas, an exhaust gas temperature signal (EGT) from a temperature sensor 158 coupled to exhaust passage 135, a profile ignition pickup signal (PIP) from a Hall effect sensor 120 (or other type) coupled to crankshaft 140, a throttle position (TP) from a throttle position sensor coupled to throttle 62, and an absolute manifold pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as cylinder fuel injector 66, throttle 62, spark plug 92, pre-chamber fuel injector 96, pre-chamber air injector 94, the intake/exhaust valves and cams, etc. The controller may receive input data from the various sensors, process the input data, and trigger the actuators in response to the processed input data based on instruction or code programmed therein corresponding to one or more routines, an example of which is described with respect to FIG. 4.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example, during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 130.

Next, FIGS. 2A-3E show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Reference axes 299 are included in each of FIGS. 2A-3E in order to compare the views and relative orientations described below. Reference axes 299 includes three axes, namely an x-axis, a y-axis, and a z-axis. A positive direction for each axis is indicated by an arrow. If the positive direction of an axis is pointing into the page, the axis is shown as a circle with an x (e.g., the x-axis in FIG. 3C), and if the positive direction of an axis points out of the page the, the axis is shown as a filled in circle (e.g., the x-axis in FIG. 2A). Further, although the components are shown as solid forms for ease of illustration in FIGS. 2A-3E, it may be understood that at least some of the components may be cavities (e.g., hollow spaces) formed by interior walls of another component, such as a cylinder head of an engine.

Turning first to FIGS. 2A-2C, example views of a pre-chamber 200, which may be included in an engine system, are shown. FIG. 2A shows a front view 201 of pre-chamber 200, FIG. 2B shows a side view 203 of pre-chamber 200, and FIG. 2C shows a top-down view 205 of pre-chamber 200. As one example, pre-chamber 200 may be similar to, or the same as, the pre-chamber 138 described above with reference to FIG. 1 and may be included within engine 10 of FIG. 1 along with some or all of the various components described above with respect to FIG. 1. FIGS. 2A-2C will be described collectively, and components of pre-chamber 200 that are similar to, or the same as, components introduced with respect to pre-chamber 138 of FIG. 1 may be numbered similarly and may function as previously described.

Pre-chamber 200 includes an upper chamber 222 and a lower chamber 218. As particularly shown in FIGS. 2B and 2C, upper chamber 222 is directly coupled to an air passage 206, which receives air from an air injector (not shown in FIGS. 2A-2C), at an opening 226. Thus, air passage 206 fluidically couples the air injector to an internal volume 252 of upper chamber 222.

As particularly shown in FIGS. 2A and 2B, upper chamber 222 is directly coupled to lower chamber 218 at a joint 220. Internal volume 252 of upper chamber 222 is fluidically coupled to an internal volume 262 of lower chamber 218 at joint 220. In particular, at least a portion of air delivered to upper chamber 222 via air passage 206 may travel along a path 202, which indicates a direction of charge motion through pre-chamber 200. The movement along path 202 may be facilitated by the shape of upper chamber 222 relative to lower chamber 218 as well as the position of air passage 206. As will be elaborated below, the movement of air along path 202 may increase charge motion and air-fuel mixing in pre-chamber 200 as well as fuel evaporation.

A pre-chamber fuel injector 296 and a pre-chamber spark plug 292 are each directly coupled to upper chamber 222. Pre-chamber fuel injector 296 is positioned to deliver fuel into upper chamber 222 via a fuel channel 232. Fuel channel 232 is arranged to direct fuel in a fuel spray direction 210, which has a fuel angle 244 from a vertical axis parallel with the z-axis, as shown in FIG. 2A. Fuel spray direction 210 directs fuel from pre-chamber fuel injector 296 diagonally across upper chamber 222 to an impingement area 224 on an inner surface 233 (shown in FIG. 2C) of upper chamber 222. Impingement area 224 comprises a portion of inner surface 233 that is proximate to opening 226, as particularly illustrated in FIG. 2C. Fuel spray direction 210 is represented by a dashed arrow in FIGS. 2A-2C. However, it may be understood that the fuel spray may have a conical shape in fuel spray direction 210, with a tip of the cone positioned at pre-chamber fuel injector 296 and a diameter of the cone increasing toward impingement area 224. In some examples, fuel angle 244 may be any angle within a range from 35 degrees to 40 degrees, within a range from 40 degrees to 45 degrees, or within a range from 45 degrees to 50 degrees relative to an axis parallel with the z-axis of reference axes 299. By directing fuel in fuel spray direction 210 at fuel angle 244, the fuel spray has additional distance to entrain air and evaporate before impinging on inner surface 233 of upper chamber 222 (compared with, for example, delivering the fuel parallel with the z-axis or parallel with the y-axis of reference axes 299). Further, fuel ignition rates may be increased relative to if the fuel were delivered further below spark plug 292.

Injected air moving along path 202 may flow across impingement area 224. For example, injecting air into upper chamber 222 may generate movement of gas within pre-chamber 200, referred to herein as charge motion, that at least partially follows path 202. The gas may be comprised of the purge air, fuel injected via pre-chamber fuel injector 296, residuals from a previous combustion cycle, and/or gases (e.g., air, fuel, and/or EGR) that enter into pre-chamber 200 from the main combustion chamber via openings in lower chamber 218 (not shown in FIGS. 2A-2C). At least a portion of the injected air may flow along a perimeter of upper chamber 222 (e.g., along inner surface 233 of upper chamber 222) before curving inward in a spiral or helix at a position proximate to spark plug 292, such as illustrated by path 202 in FIG. 2C.

While fuel is being delivered via pre-chamber fuel injector 296 and purge air is delivered via air passage 206, the purge air flows across impingement area 224 and through the fuel spray provided in fuel spray direction 210. Due to the purge air moving through the fuel spray and across impingement area 224, at least a portion of the fuel delivered in fuel spray direction 210 may evaporate and mix with the purge air to form an air-fuel mixture. The purge air, which may include the air-fuel mixture while the fuel is injected, travels toward spark plug 292, as illustrated in FIGS. 2A-2C by path 202. As particularly shown in FIG. 2B, the purge air flows from opening 226 into the upper chamber 222 toward a ground electrode 212 of spark plug 292 (e.g., vertically upward toward ground electrode 212 in the direction of the z-axis). The purge air arcs above ground electrode 212, toward a center electrode 216 of spark plug 292, before being directed vertically downward and away from spark plug 292 toward lower chamber 218. Additionally, as the purge air arcs around ground electrode 212, the purge air flows in a circumferential direction of the upper chamber 222 around the ground electrode 212 (e.g., in a circular direction within a plane parallel to a plane formed by the x-axis and y-axis), as particularly shown in FIG. 2A. As a result, path 202 of the charge motion is at least partially helical about ground electrode 212. For example, the purge air may create vortex within upper chamber 222 around ground electrode 212 that brings the air-fuel mixture to a top of upper chamber 222 proximate to spark plug 292. As such, the purge air may re-direct some fuel droplets before they hit impingement area 224 as well as evaporate a fuel film that may form on upper chamber 222 at impingement area 224. As a result, wall wetting within pre-chamber 200 may be decreased. Further, mixing of the air and fuel may be increased.

By following path 202, the purge air may create a first swirling motion in upper chamber 222, which may reinforce with a second swirling motion that may be created by inflow from the main combustion chamber during a compression stroke after the flow of purge air has stopped (e.g., when air injector 294 is fully closed). The inflow from the main combustion chamber may further enhance charge motion in pre-chamber 200, which may further increase burn rates. Spark plug 292 may ignite the air-fuel mixture within pre-chamber 200, and combustion within pre-chamber 200 may ignite an air-fuel mixture within a main combustion chamber (e.g., cylinder 130 of FIG. 1), which may have a different air-fuel ratio than the air-fuel mixture in the pre-chamber.

Figure 3A:
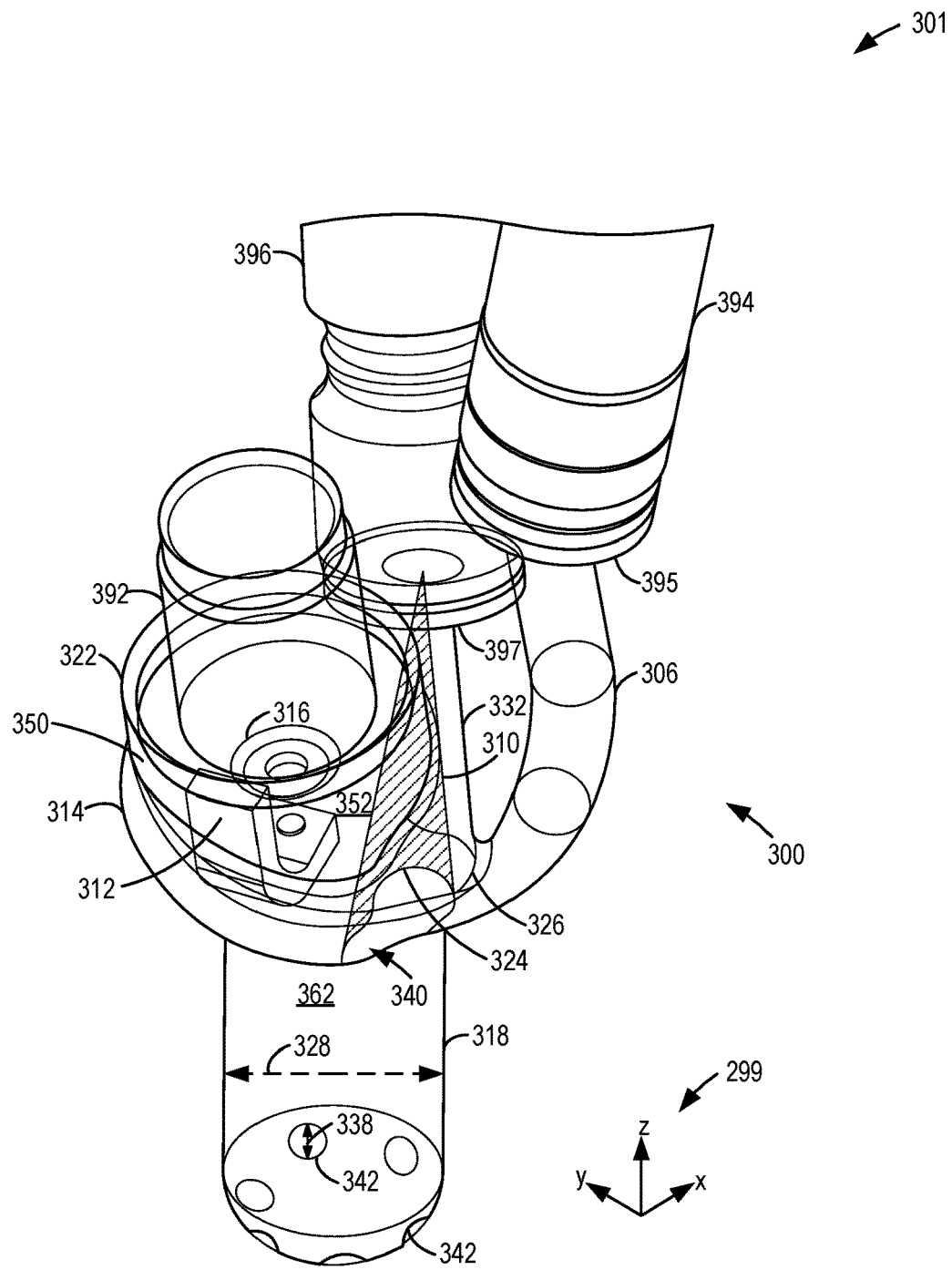
FIG. 3A depicts a perspective view of an exemplary pre-chamber having an upper section including an offset spark plug, a fuel injector, and an air injector coupled thereto and a lower section including a plurality of orifices for communicating with a main combustion chamber.
Figure 3B:
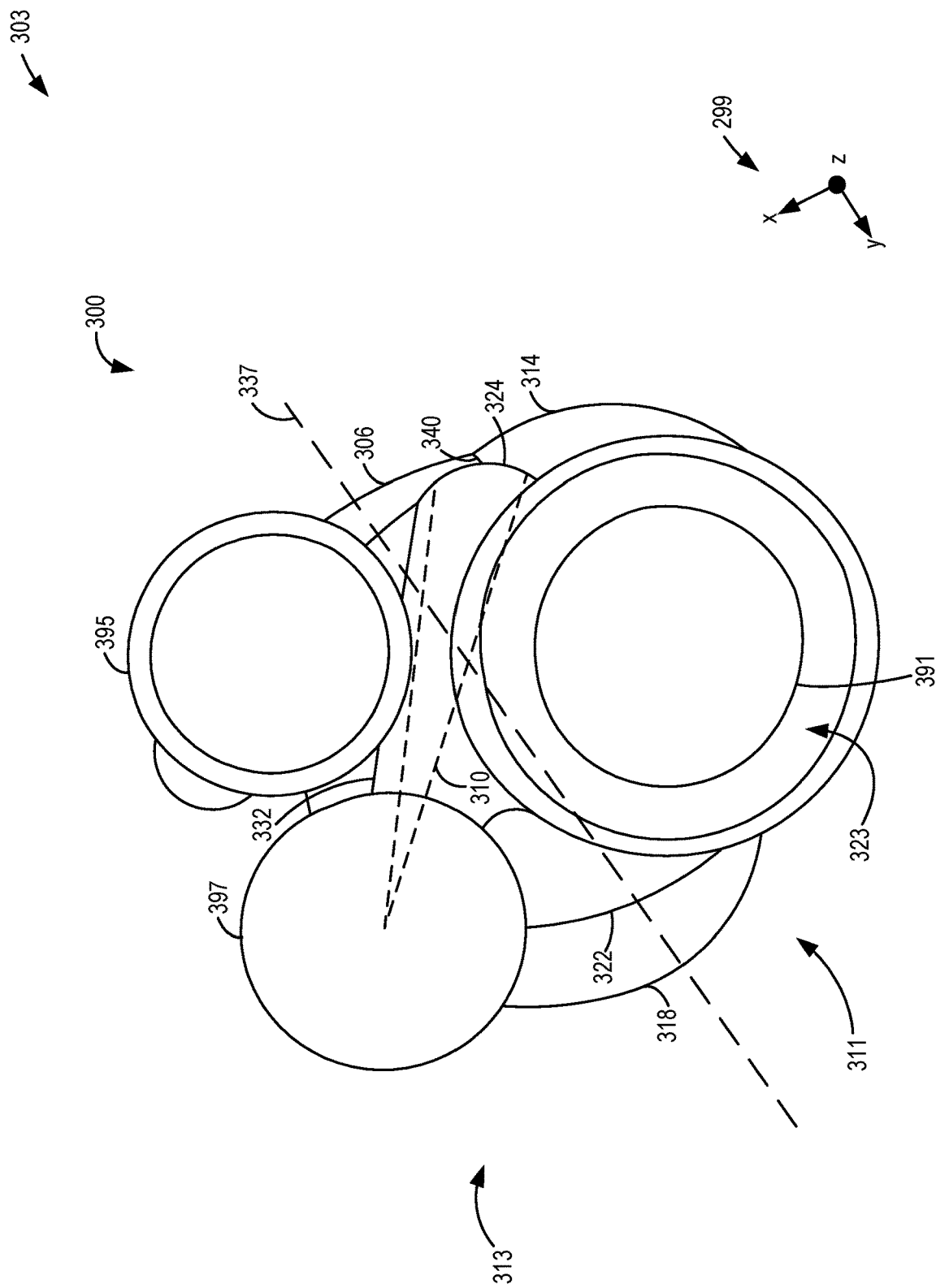
FIG. 3B depicts a top-down view of the pre-chamber of FIG. 3A.
Figure 3C:
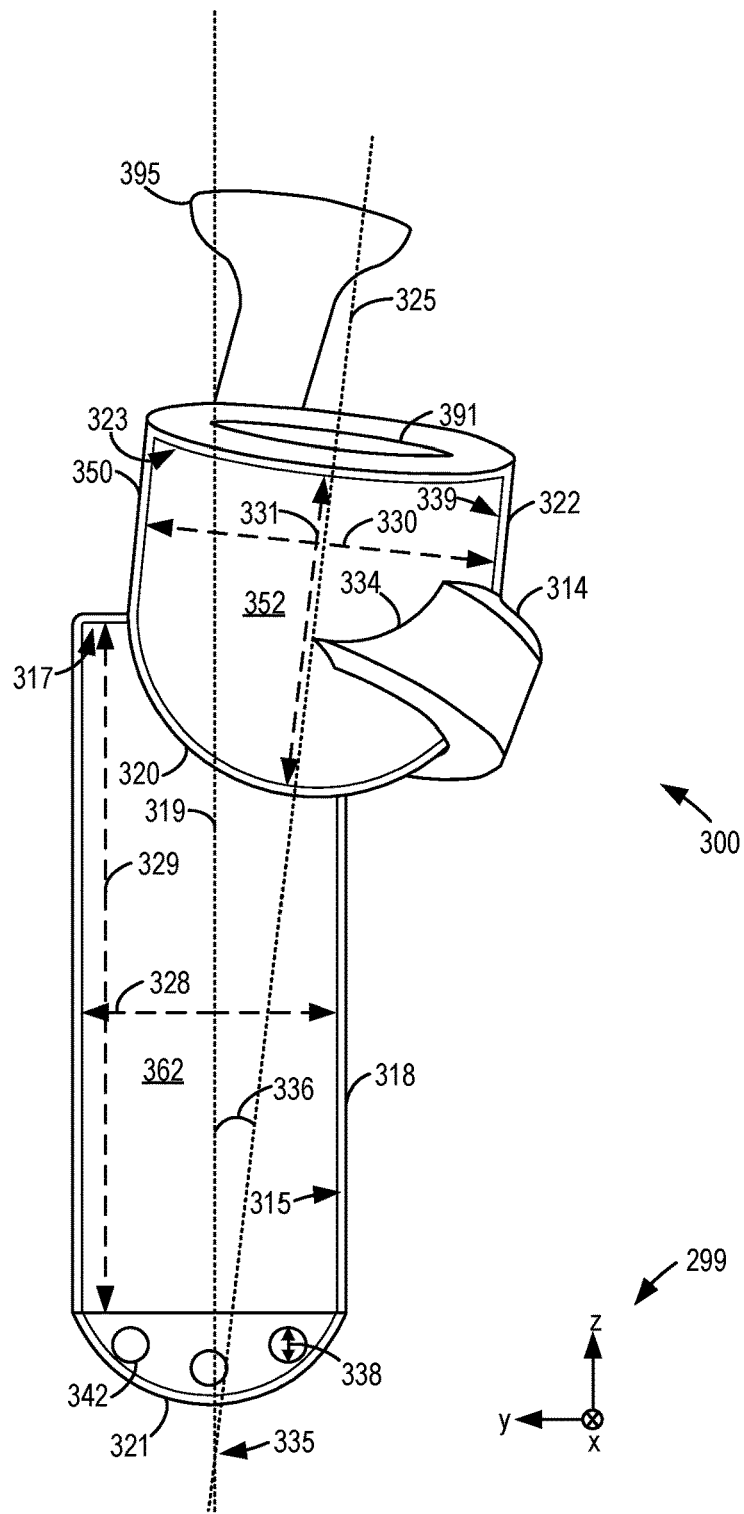
FIG. 3C depicts a front view of the pre-chamber of FIG. 3A.
Figure 3D:
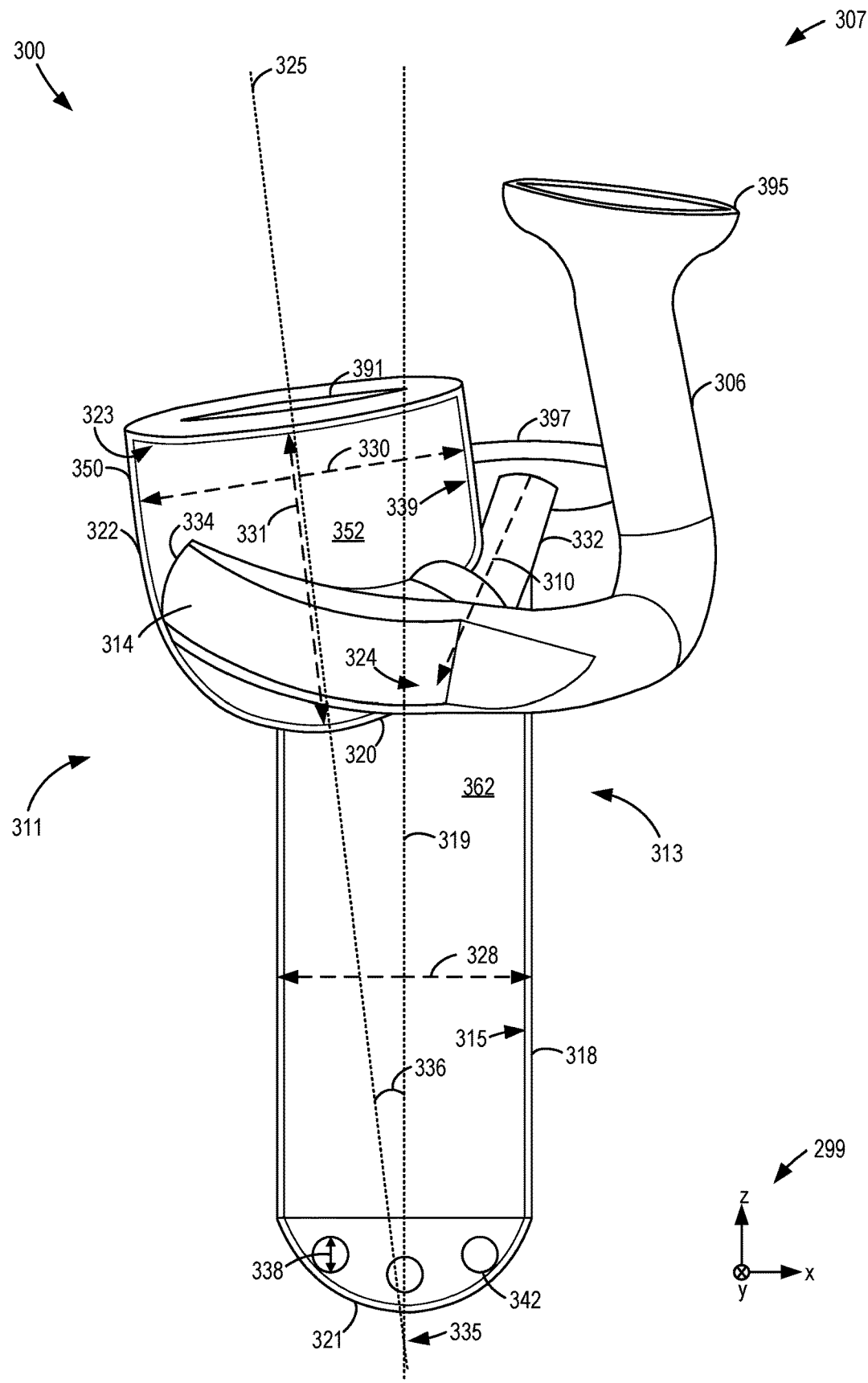
FIG. 3D depicts a side view of the pre-chamber of FIG. 3A.
Figure 3E:
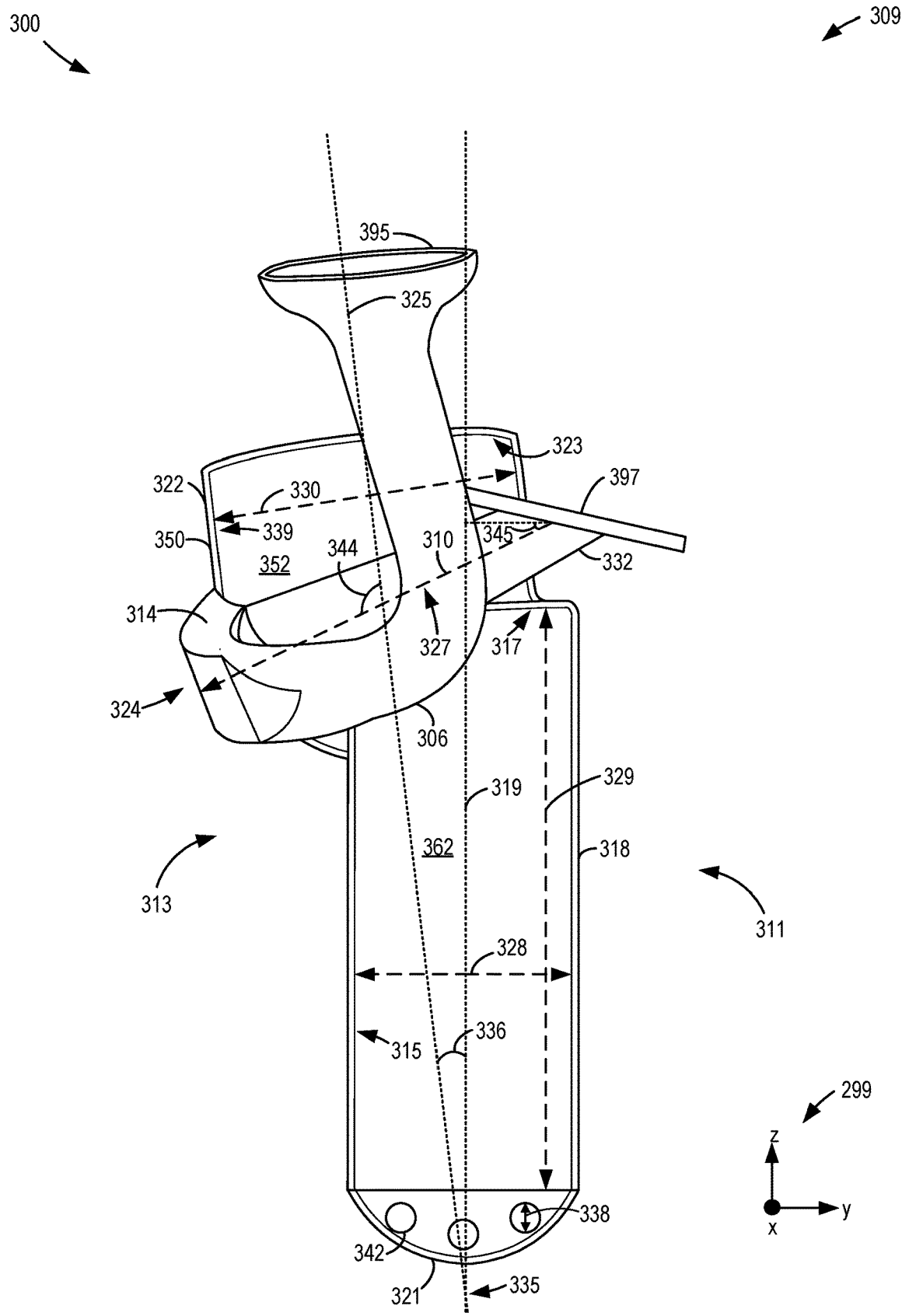
FIG. 3E depicts a back view of the pre-chamber of FIG. 3A.

Turning now to FIGS. 3A-3E, different views of a pre-chamber 300 are shown that further highlight an example three-dimensional arrangement of each of a pre-chamber fuel injector 396, an air injector 394, and a spark plug 392 with respect to internal and external chambers and passages. Pre-chamber 300 is one exemplary embodiment of pre-chamber 200 and may be included in engine 10 of FIG. 1, at least in some examples. Therefore, pre-chamber 300 may be similar to, or the same as, pre-chamber 138 described above with reference to FIG. 1 and pre-chamber 200 described with respect to FIGS. 2A-2C. FIGS. 3A-3E will be described collectively, and components of pre-chamber 300 that are similar to, or the same as, components introduced with respect to pre-chamber 138 of FIG. 1 and pre-chamber 200 of FIGS. 2A-2E are numbered similarly and may function as previously described (e.g., spark plug 392 corresponds to spark plug 292 of FIGS. 2A-2C and spark plug 92 of FIG. 1). FIG. 3A shows a perspective view 301 of pre-chamber 300 that shows contour lines of some interior surfaces of pre-chamber 300 in order to highlight a geometry of those surfaces, as will be elaborated below. Lines indicating interior features of pre-chamber 300 are shown with a lighter line weight in FIGS. 3A-3E. Lines indicating contour also have a lighter line weight in FIGS. 3A-3E. FIG. 3B shows a top view 303 of pre-chamber 300, FIG. 3C shows a front view 305 of pre-chamber 300, FIG. 3D shows a side view 307 of pre-chamber 300, and FIG. 3E shows a back view 309 of pre-chamber 300. While FIG. 3A is a transparent view, FIGS. 3B-3E include semi-transparent views in order to highlight select interior features. Additionally, reference axes 299 are included in each of FIGS. 3A-3E in order to compare the views and relative orientations of FIGS. 3A-3E with those of FIGS. 2A-2C.

Pre-chamber 300 includes an upper chamber 322 and a lower chamber 318. Upper chamber 322 (e.g., a first chamber portion) and lower chamber 318 (e.g., a second chamber portion) are directly coupled at a curved joint 320 shown in FIGS. 3C and 3D. For example, joint 320 includes an area where surfaces (e.g., sidewalls) of upper chamber 322 and lower chamber 318 are joined together and further includes an opening that fluidically couples an internal volume (e.g., cavity) 352 of upper chamber 322 with an internal volume 362 of lower chamber 318. As another example, joint 320 may at least partially form a bottom-most surface of upper chamber 322. Internal volume 352 and internal volume 362 are each shown in FIGS. 3A and 3B-3E. Further, due to their hollow interiors, upper chamber 322 may be referred to as a first combustion cavity of pre-chamber 300, and lower chamber 318 may be referred to as a second combustion cavity of pre-chamber 300.

As shown in FIGS. 3C-3E, upper chamber 322 includes a first central axis 325, while lower chamber 318 includes a second central axis 319 that is angled with respect to first central axis 325. Thus, upper chamber 322 is centered on first central axis 325, and lower chamber 218 is centered along second central axis 319, which is different from second central axis 319. Second central axis 319 of lower chamber 318 is parallel to the z-axis of reference axes 299. First central axis 325 is radially offset from second central axis 319, and thus from the z-axis, by an offset angle 336. Offset angle 336 is a non-zero angle and may be an acute angle. For example, offset angle 336 may be in a range from 5 to 10 degrees, in a range from 10 to 30 degrees, or in a range from 30 to 40 degrees. Further, first central axis 325 and second central axis 319 intersect at an intersection point 335 that is vertically below lower chamber 318.

In the present example, upper chamber 322 comprises a substantially bowl-shaped cavity having a width 330 and a height 331, as particularly shown in FIGS. 3C and 3D. Width 330 spans upper chamber 322 between directly opposite inner surfaces of sidewalls 339. Sidewalls 339 comprise a body of upper chamber 322, partially defining interior volume 352, and may be coaxial with first central axis 325. Thus, width 330 spans between directly opposite inner surfaces of upper chamber 322 in a direction that is normal (e.g., perpendicular) to first central axis 325. Further, sidewalls 339 may have thickness (e.g., width) between the inner surface and an outer surface. Sidewalls 339 may be comprised of metal, for example. However, in other examples, sidewalls 339 may include only inner surfaces defining a cavity within the cylinder head, such as when pre-chamber 300 is cast or otherwise machined directly into a cylinder head.

Height (e.g., length) 331 of upper chamber 322 comprises a greatest distance between an inner surface of a top (e.g., top-most) surface 323 of upper chamber 322 and a bottom-most inner surface of upper chamber 322 (e.g., at joint 320) in the direction of first central axis 325 (e.g., parallel to first central axis 325). Top surface 323 may be a substantially planar surface that is normal to first central axis 325 and may have a thickness that is similar to or the same as the thickness of sidewalls 339. Top surface 323 further defines internal volume 352. Alternatively, top surface 323 may not have a thickness and may be defined by the inner surface, such as when pre-chamber 300 is cast or otherwise machined directly into the cylinder head.

In the example shown, lower chamber 318 includes a cylindrical portion having a width 328 and a height 329 (shown in FIGS. 3C and 3E), and the cylindrical portion is capped by a hemispherical portion 321 that forms a bottom surface of lower chamber 318, as particularly shown in FIGS. 3C-3E. However, in other examples, lower chamber 318 may be rectangular, kidney shaped, spherical, conical, or the like. Similarly, in other examples, hemispherical portion 321 may be another shape, such as rectangular, conical, trapezoidal, and the like, or may not be included as a distinctly shaped portion of lower chamber 318. Width (e.g., height) 328 spans lower chamber 318 between directly opposite inner surfaces of sidewalls 315 of the cylindrical portion and is normal to second central axis 319. Sidewalls 315 comprise a body of lower chamber 318 and are coaxial with second central axis 319. Thus, width 328 spans lower chamber 318 from an inner surface of lower chamber 318 to a directly opposite inner surface of lower chamber 318, while height 329 spans the cylindrical portion of lower chamber 318 from an inner surface top (e.g., top-most) surface 317 to hemispherical portion 321 in the direction of second central axis 319 (e.g., parallel to second central axis 319). Further, sidewalls 315, top surface 317, and hemispherical portion 321 define internal volume 362. Hemispherical portion 321 may be the closest component of pre-chamber 300 relative to a piston within a cylinder (e.g., piston 136 of FIG. 1). Further, in some examples, some or all of sidewalls 315, top surface 317, and hemispherical portion 321 have a thickness between corresponding inner surfaces and outer surfaces, while in other examples, some or all of sidewalls 315, top surface 317, and hemispherical portion 321 are defined by inner surfaces forming defined cavities within the cylinder head (e.g., when pre-chamber 300 is cast or otherwise machined directly into the cylinder head).

In the present example, width 328 of lower chamber 318 is less than width 330 of upper chamber 322. For example, width 328 may be 1.25 to 1.5 times smaller than width 330. In other examples, width 328 may be 1.5 to 1.75 times or 1.75 to 2 times smaller than width 330. Further, height 329 of lower chamber 318 is greater than height 331 of upper chamber 322. For example, height 329 may be 1.5 to 2.5 times greater than height 331. In other examples, height 329 may be 0.5 to 1.5 times or 2.5 to 3.5 times greater than height 331. Joint 320 is positioned such that height 331 of upper chamber 322 partially overlaps with height 329 of lower chamber 318. For example, top surface 317 of lower chamber 318 is positioned vertically above (e.g., with respect to the z-axis of reference axes 299) joint 320, while hemispherical portion 321 is positioned vertically below joint 320.

Hemispherical portion 321 fluidically couples internal volume 362 of lower chamber 318 (shown in FIG. 3A) to an internal volume of a main combustion chamber (e.g., of the cylinder, such as cylinder 130 of FIG. 1) via a plurality of openings 342. Openings may be arranged radially with respect to second central axis 319. In the example of pre-chamber 300, openings 342 have a circular cross-sectional area, but in other examples, openings 342 may be oval or rectangular slits (e.g., having a longer width with a shorter height or a shorter width with a longer height), or other shapes. A diameter 338 of openings 342 is smaller than width 328 of lower chamber 318. For example, diameter 338 may be 5.5 to 6 times smaller than width 328, 6 to 6.5 times smaller than width 328, or 6.5 to 7 times smaller than width 328. As such, gas flow through openings 342 (e.g., into lower chamber 318 from the main combustion chamber or out of lower chamber 318 to the main combustion chamber) is restricted.

In some examples, a nozzle cap may be included and arranged at hemispherical portion 321 of lower chamber 318. The nozzle cap may enclose hemispherical portion 321 of lower chamber 318 and may be shaped as a hemisphere with a larger diameter than lower chamber 318. For example, the diameter of the nozzle cap may be larger than width 328. Openings 342 may align with and may be fluidically coupled to hollow passages that extend from an interior surface of the nozzle cap to an exterior surface of the nozzle cap. For example, the interior surface of the nozzle cap may be in face-sharing contact with an exterior surface of the bottom portion of lower chamber 318. Together, the openings 342 and the hollow passages extending through the nozzle cap may provide fluidic coupling of the main combustion chamber with pre-chamber 300.

A plane 337 shown in FIG. 3B may vertically bisect pre-chamber 300 into a first side 311 and a second side 313. For example, plane 337 may be a y-z plane that is centered on second central axis 319 of lower chamber 318. Top surface 323 of upper chamber 322 includes an opening 391 shaped to receive spark plug 392, and spark plug 392 may extend from an exterior of upper chamber 322, through opening 391, and into internal volume 352. For illustrative clarity, spark plug 392 is not shown in FIGS. 3B-3E. Opening 391 is shown in FIG. 3B positioned on first side 311, while an air injector coupling port 395 and a pre-chamber fuel injector coupling port 397 are positioned on second side 313. As such, when coupled, spark plug 392 may be positioned on first side 311, while air injector 394 and pre-chamber fuel injector 396 are each positioned on second side 313. Further, because of offset angle 336 between first central axis 325 and second central axis 319, second side 313 includes a greater portion of upper chamber 322 (e.g., a greater portion of internal volume 352), as particularly shown in FIG. 3E.

As shown in FIG. 3A, air injector 394 is coupled to upper chamber 322 through an air passage 306 comprising air injector coupling port 395, which is shaped to receive air injector 394. Air injector 394 may be a cylindrical injector, as shown, and a diameter of air passage 306 may be less than a diameter of air injector 394. For example, air passage 306 may be sized such that air transitioning from air passage 306 through opening 326 into upper chamber 322 may increase in speed. In this way, the injected air may have a high velocity as the injected air flows into upper chamber 322. For illustrative clarity, air injector coupling port 395 is shown without air injector 394 in FIGS. 3B-3E, although it may be understood that air injector 394 may be coupled thereto. Air passage 306 is shown as an arched passage, with the arch bending (e.g., curving, arcing, etc.) away from upper chamber 322 and bending back toward upper chamber 322 to couple to upper chamber 322 through an opening 326 in sidewalls 339 at a position proximate to lower chamber 318 (e.g., near joint 320 between upper chamber 322 and lower chamber 318). Air passage 306 may be shaped differently, such as a cylindrical tube forming a straight line from air injector 394 to opening 326, based on packaging considerations within the engine. For example, it may be desirable to reduce (e.g., minimize) a length of air passage 306 from air injector 394 to opening 326, such that in some examples, a length of the air passage is decreased relative to the example shown in FIGS. 3A and 3C-3E. Additionally, opening 326 may match the shape of air passage 306 (e.g., may have a same cross-sectional shape, profile, diameter, etc. as the air passage) or may have another shape (e.g., rectangular, oval, or the like). In some examples, opening 326 may have a smaller cross-sectional area than air passage 306 to form a venturi restriction between air passage 306 and internal volume 352 of upper chamber 322.

At least a portion of air delivered to upper chamber 322 by air passage 306 may be directed through a channel 314 that wraps around at least a portion of a perimeter 350 of upper chamber 322. Channel 314 curves along perimeter 350 of upper chamber 322 from an inlet 340 (shown in FIGS. 3A and 3B) that is proximate to opening 326 (shown in FIG. 3A) to an outlet 334 (shown in FIGS. 3C and 3D). Channel 314 curves upward (e.g., in the positive direction of the z-axis) toward spark plug 392 between inlet 340 and outlet 334. Outlet 334 is vertically and horizontally spaced away from inlet 340. That is, outlet 334 has a different horizontal (e.g., with respect to the x- and y-axes of reference axes 299) and vertical (e.g., with respect to the z-axis of reference axes 299) position than inlet 340. Channel 314 may be open to internal volume 352 (shown in FIG. 3A) of upper chamber 322 such that channel 314 increases a cross-sectional area of upper chamber 322. For example, the cross-sectional area across the width 330 of upper chamber 322 is greater in positions (e.g., planar cross-sections that are normal to first central axis 325) that include channel 314 relative to those that do not include channel 314. Channel 314 may be a semi-cylinder. As another example, channel 314 may be shaped as a rectangular passage. In other embodiments, channel 314 may be excluded, such as in pre-chamber 200 of FIGS. 2A-2C. Channel 314 may increase a concentration of purge air and fuel around spark plug 392, as the channel directs a portion of the purge air and fuel to an area proximate electrodes of spark plug 392, as will be elaborated below.

Pre-chamber fuel injector 396 is coupled to upper chamber 322 via a fuel injector coupling port 397, as shown in FIG. 3A. For illustrative clarity, fuel injector coupling port 397 is shown without pre-chamber fuel injector 396 in FIGS. 3B-3E, although it may be understood that pre-chamber fuel injector 396 may be coupled thereto. When actuated (e.g., energized), pre-chamber fuel injector 396 delivers fuel into upper chamber 322 through a fuel channel 332 in a fuel spray direction 310. Fuel channel 332 comprises a side extension from upper chamber 322 and includes fuel injector coupling port 397, which is shaped to receive pre-chamber fuel injector 396. Fuel channel 332 may be cylindrical, rectangular, or any other shape that allows fuel to enter upper chamber 322 without impediment. The fuel spray forms a conical shape in fuel spray direction 310, which is shown in FIG. 3A, with a diameter of the conical shape increasing toward an inner surface of upper chamber 322 at an impingement area 324 near opening 326. The proximity to opening 326 may result in the air flowing across impingement area 324 having a relatively high velocity due to the increase in speed created at opening 326. A portion of impingement area 324 may be arranged at inlet 340 of channel 314.

As particularly shown in FIG. 3E, fuel spray direction 310 is angled with respect to each of first central axis 325 and second central axis 319. Further, fuel spray direction 310 is angled with respect to an axis normal to second central axis 319 (e.g., parallel with the y-axis of reference axes 299). As shown, fuel spray direction 310 has a first fuel angle 344 with respect to first central axis 325 and a second fuel angle 345 with respect to the axis that is normal to second central axis 319. First fuel angle 344 may be an obtuse angle while second fuel angle 345 is an acute angle, as shown, although other angles may be used. Fuel spray direction 310 is angled downward toward joint 320, which increases a distance traveled by the fuel spray relative to if the fuel spray direction were normal to first central axis 325. For example, the fuel spray may travel a distance 327 between fuel injector coupling port 397 and impingement area 324 (e.g., the length of the dashed line representing fuel spray direction 310). Distance 327 is greater than width 330 of upper chamber 322. Further, distance 327 may be greater than height 331 of upper chamber 322 (e.g., shown in FIGS. 3C and 3D), at least in some examples.

By directing the fuel spray across upper chamber 322, from second side 313 to first side 311, a likelihood of evaporation of the fuel as the fuel is sprayed toward the impingement area 324 may be increased. Additionally, because impingement area 324 is near opening 326, purge air may sweep across impingement area 324 to decrease fuel film formation at impingement area 324, such as described above with respect to FIGS. 2A-2C. Further, fuel spray direction 310 results in impingement area 324 being closer to spark plug 392 than if the fuel spray were delivered more directly toward lower chamber 318 (e.g., in the negative z-direction of reference axes 299).

In this way, fuel injected via pre-chamber fuel injector 396 mixes with air injected by air injector 394 to form an air-fuel mixture within pre-chamber 300. Charge motion of the air-fuel mixture may be enhanced by channel 314 and may bring a rich pocket of the air-fuel mixture proximate to spark plug 392, such as the charge motion described above with respect to FIGS. 2A-2C. Spark plug 392 (shown in FIG. 3A) is coupled to top surface 323 of upper chamber 322 (shown in FIGS. 3B-3E) and may initiate combustion of the air-fuel mixture within pre-chamber 300. As shown in FIG. 3A, spark plug 392 includes a center electrode 316 and a ground electrode 312 that are positioned internally within upper chamber 322 (e.g., within internal volume 352). Upon actuation (e.g., energization of spark plug 392), a spark is formed between center electrode 316 and ground electrode 312, which may ignite the air-fuel mixture within pre-chamber 300, beginning with the rich air-fuel pocket proximate to spark plug 392.

A central axis 393 of spark plug 392, shown in FIG. 3B, is angled away (e.g., offset) from second central axis 319 of lower chamber 318 (e.g., shown in FIGS. 3C-3E). The central axis 393 of spark plug 392 may be parallel to or coaxial with first central axis 325 of upper chamber 322, at least in some examples. As an example, spark plug 392 may be offset for packaging within the engine. When air and fuel are injected, the air-fuel mixture swirls at high speeds around ground electrode 312 due to the charge motion created by the positioning of air passage 306 and channel 314 with respect to spark plug 392. Thus, by angling ground electrode 312 and center electrode 316, combustion initiated by the spark between ground electrode 312 and center electrode 316 may more reliably produce combustion, which may spread throughout pre-chamber 300 with an increased burn rate.

Air and fuel injected into upper chamber 322, as well as a flame front of the combustion initiated by the spark at spark plug 392, may be directed toward lower chamber 318. The flame front may exit lower chamber 318 and enter the main combustion chamber via the openings 342 as jets of flame and hot gas. These jets of flame and hot gas may ignite an air-fuel mixture in the main combustion chamber, which may have a different (e.g., leaner) AFR than the air-fuel mixture that was ignited in pre-chamber 300 and/or a different (e.g., higher) dilution. However, in order to obtain efficient combustion in both pre-chamber 300 and the main combustion chamber, control of the various fuel injection amounts, air injection amounts, and ignition timing is desired. For example, precise control of the air injection and the fuel injection into the pre-chamber may increase charge motion and fuel evaporation in order to maximize the advantageous structural arrangement described above with reference to FIGS. 2A-3E.

Figure 4:
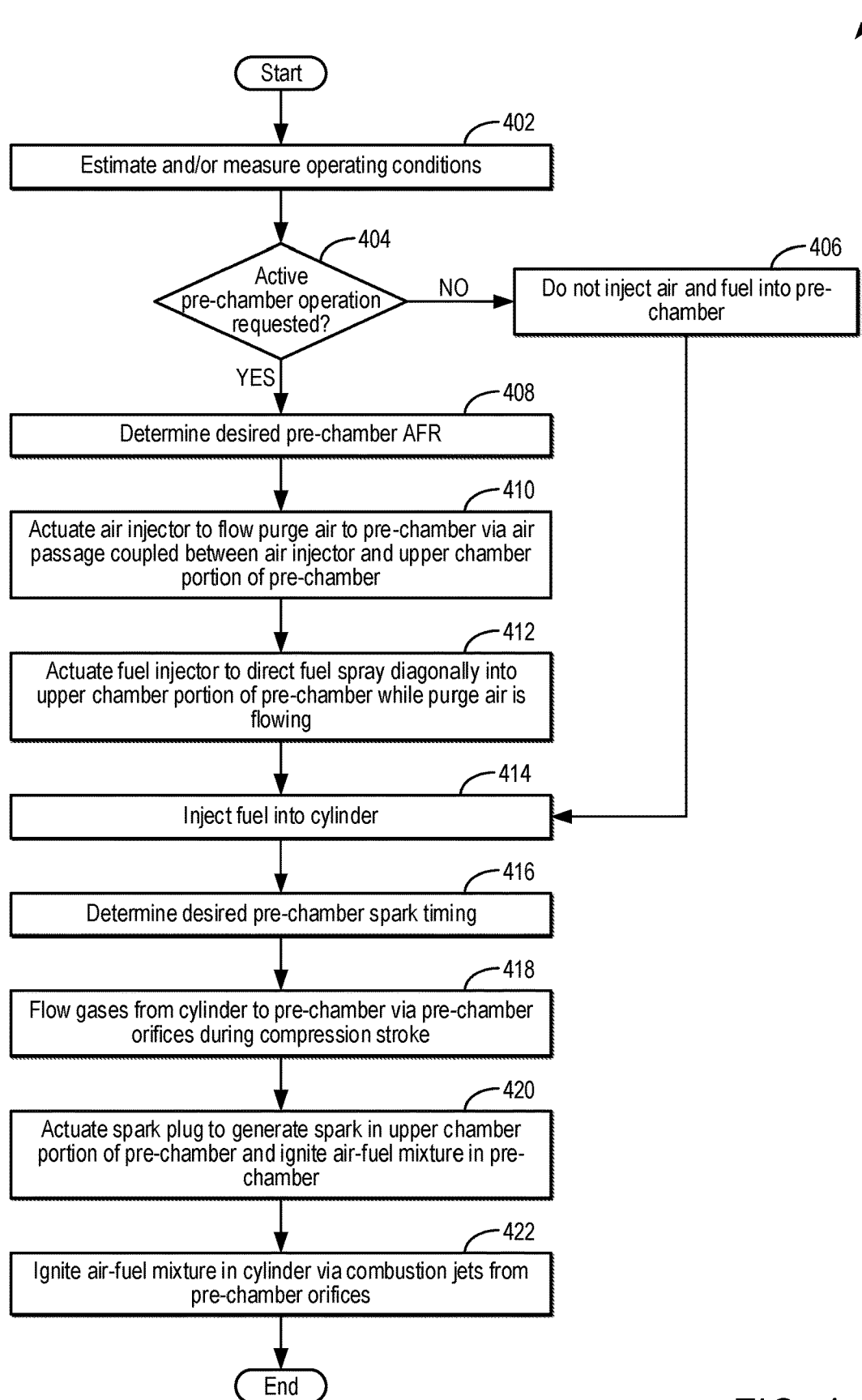
FIG. 4 is a flow chart of a method for operating a pre-chamber and a cylinder of an engine to increase mixing and charge motion in the pre-chamber for pre-chamber ignition with an enhanced burn rate.
Figure 5:
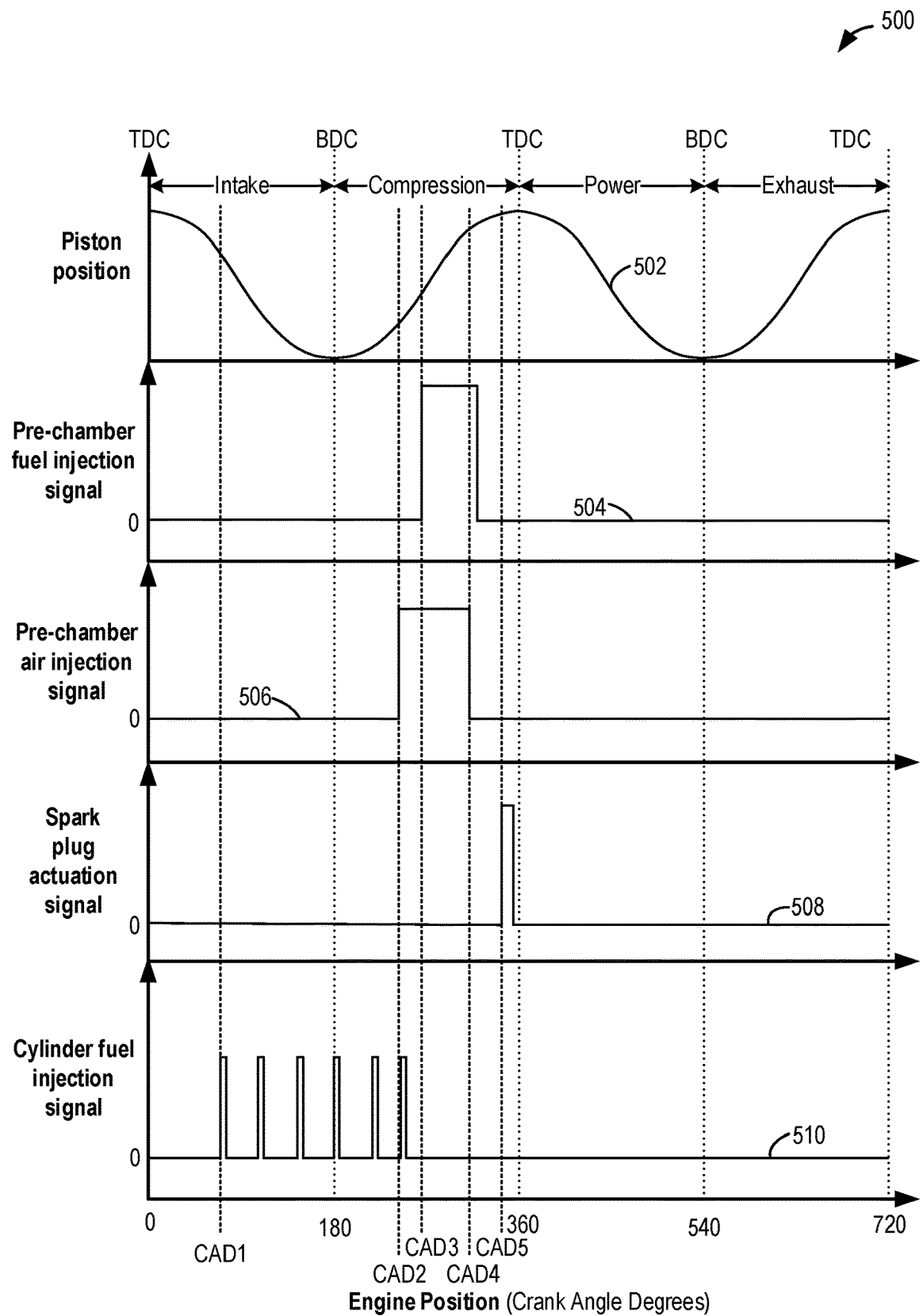
FIG. 5 depicts a timing chart for operating a pre-chamber during a four-stroke engine cycle.

Therefore, FIG. 4 shows an example method 400 for operating a pre-chamber and a cylinder (e.g., main combustion chamber) of an engine to increase mixing and charge motion in the pre-chamber for pre-chamber ignition with an enhanced burn rate. Method 400 will be described with respect to engine 10 and the cylinder configuration shown in FIG. 1 and pre-chamber 300 shown in FIGS. 3A-3E, although method 400 may be applied in other systems comprising a pre-chamber including a spark plug, a fuel injector, and an air injector. Note that the air injector may inject ambient air, oxygen-enriched air, pure oxygen, or any combination thereof. Further, method 400 will be described for one pre-chamber and cylinder pair, although it may be understood that method 400 may be simultaneously and/or sequentially executed for every cylinder of the engine. Instructions for carrying out method 400 may be executed by a controller, such as controller 12 of FIG. 1, based on instructions stored on a memory of the controller and in conjunction with signals received from sensors of the engine system, such as the sensors described above with reference to FIG. 1. The controller may employ actuators of the pre-chamber and the cylinder, including a pre-chamber fuel injector (e.g., pre-chamber fuel injector 396 of FIG. 3A), a pre-chamber spark plug (e.g., pre-chamber spark plug 392 of FIGS. 3A-3E), a pre-chamber air injector (e.g., pre-chamber air injector 394 shown in FIG. 3A), and a cylinder fuel injector (e.g., fuel injector 66 of FIG. 1) to adjust engine operation according to the method described below.

At 402, method 400 includes estimating and/or measuring operating conditions. The operating conditions may include, for example, a vehicle speed, an engine speed, an engine load, an engine temperature, an exhaust gas AFR, a desired cylinder AFR, an accelerator pedal position, a brake pedal position, and a position of a throttle (e.g., a throttle position). The operating conditions may be measured by one or more sensors communicatively coupled to the controller or may be inferred based on available data. For example, the accelerator pedal position may be measured by an accelerator pedal position sensor, such as accelerator pedal position sensor 118 of FIG. 1, and the brake pedal position may be measured by a brake pedal position sensor, such as brake pedal position sensor 119 of FIG. 1. Together, the accelerator pedal position and the brake pedal position may indicate a demanded amount of engine torque. As another example, the exhaust gas AFR may be determined based on an oxygen level detected by an exhaust gas oxygen sensor, such as exhaust gas sensor 128 of FIG. 1. Similarly, the throttle position may be measured using a throttle position sensor coupled to the throttle.

At 404, method 400 includes determining whether active pre-chamber operation is requested. Active pre-chamber operation may include injecting air and/or fuel into the pre-chamber via dedicated injectors (e.g., the pre-chamber air injector and the pre-chamber fuel injector, respectively). In some examples of active pre-chamber operation, fuel may be injected into the pre-chamber while air is not and vice versa (air is injected while fuel is not), as will be elaborated below. Active pre-chamber operation may be desired when a high dilution is desired in the cylinder or when it is desired to increase a temperature of a catalyst (e.g., emission control device 178 shown in FIG. 1). Active pre-chamber operation may be referred to herein as operating the pre-chamber in an active mode, which may include a plurality of sub-modes (e.g., a fuel only mode, a high engine dilution mode, a catalyst warming mode, and a pre-chamber temperature control mode). When active pre-chamber operation is not desired, it may be desired to operate the pre-chamber in a passive mode, also referred to herein as passive pre-chamber operation. Passive pre-chamber operation includes not injecting air into the pre-chamber via the pre-chamber air injector and not injecting fuel into the pre-chamber via the pre-chamber fuel injector. Instead, air, fuel, and exhaust gases passively flow between the pre-chamber and the cylinder based on a pressure difference between the pre-chamber and the cylinder. The passive mode may be desired when the cylinder is operating in low dilution conditions, such as when the engine is operating at full load.

If active pre-chamber operation is requested at 404, method 400 proceeds to 408 and includes determining a desired pre-chamber AFR (e.g., a ratio of an amount of air injected to an amount of fuel injected into the pre-chamber). As one example, the desired AFR of the pre-chamber may be determined by the controller based on the desired AFR of the cylinder, such that combustion of an air-fuel mixture in the pre-chamber ignites an air-fuel mixture in the cylinder while minimizing emissions. For example, the controller may input the desired AFR of the cylinder and the current engine operating conditions, such as engine temperature and fuel composition, into one or more look-up tables, function, and maps, which may output the desired pre-chamber AFR to achieve combustion. As an example, the desired AFR of the pre-chamber may be stoichiometry. As another example, the desired AFR of the pre-chamber may be rich relative to stoichiometry during an engine cold start condition, which may increase combustion stability in the cold start condition, for example. As still another example, the desired AFR of the pre-chamber may be richer than stoichiometry when fuels with higher evaporation temperatures, such as E85, are used in order to account for evaporated fuel that participates in the combustion and non-evaporated fuel that does not participate in combustion to achieve a substantially stoichiometric combustion with the evaporated fuel. As yet another example, the desired AFR of the pre-chamber may be adjusted from stoichiometry when the AFR of the cylinder is adjusted from stoichiometry so that when the combustion gases from the cylinder and the pre-chamber are combined, the combined gases have an AFR approximately equal to stoichiometry.

At 410, method 400 includes actuating the air injector to flow purge air to the pre-chamber via an air passage coupled between the air injector and an upper chamber portion of the pre-chamber. In some examples, the purge air may be ambient air from an intake manifold of the engine, while in other examples, the pre-chamber air injector may provide onboard-generated $O_2$. In still other examples, the purge air may be oxygen enriched air or may include another combustible gas. For example, the pre-chamber air injector may inject the purge air into a passage coupled to an upper chamber of the pre-chamber (e.g., air passage 306 shown in FIGS. 3A-3E). As the purge air flows into the pre-chamber through the passage, the purge air flows across an impingement area for fuel injected into the pre-chamber. The purge air may form a swirling, vortex-like path, going over and around a ground electrode of the spark plug in the pre-chamber, and down into a lower chamber of the pre-chamber. The path of the purge air is further described with reference to FIGS. 2A-2C. For example, the purge air may force out (e.g., purge) residual gases from the previous pre-chamber firing event from the pre-chamber via a plurality of orifices in a lower chamber portion of the pre-chamber, the plurality of orifices fluidically coupling an interior volume of the pre-chamber (e.g., comprising both the upper chamber portion and the lower chamber portion) to an interior volume of the cylinder (e.g., main combustion chamber). During an intake stroke and early in a compression stroke of the cylinder, a pressure in the cylinder may be lower than a pressure in the pre-chamber, creating a pressure differential that may assist in purging residual gases from the pre-chamber.

In some examples, the purge air injection amount may be held substantially constant across operating conditions while only a fuel injection amount is varied to compensate for changes in the desired AFR (as described below at 414). For example, the amount of purge air injected may be approximately equal to the volume in the pre-chamber in order to reduce the content of the residual gases in the pre-chamber to a desired level. For example, the air injection may be used to purge residual gases from the pre-chamber for the high engine dilution mode (e.g., when the engine is operating with a high dilution) and for the catalyst warming mode. In other examples, the purge air injection amount may vary according to engine operating conditions. As one example, the pre-chamber temperature control mode may be used to reduce an amount of time that surfaces of the pre-chamber are exposed to purge hot combustion gases by injecting cooler purge air. In such an example, the purge air injection amount may be determined based on a desired amount of cooling (e.g., a difference between a current pre-chamber surface temperature and a desired pre-chamber surface temperature).

For example, the controller may adjust an amount of purge air injected into the pre-chamber based on the desired AFR of the pre-chamber, as determined at 408, an estimated amount of residual gases present in the pre-chamber, the desired amount of cooling (when operating in the pre-chamber temperature control mode), and a piston position. As an example, the controller may input the engine operating conditions, including the piston position, the desired amount of cooling, and the desired AFR of the pre-chamber, into a look-up table, algorithm, or map, which may output a desired purge air injection amount. In some examples, the desired air injection amount may be zero, such as when the cylinder is operated lean and the pre-chamber is operated in the fuel only mode.

Further, a timing for actuating the air injector may be adjusted based on the operating conditions. For example, the controller may refer to a look-up table having the engine speed and load as the input and output a desired timing for the air injection according to the input engine speed-load. In another example, the controller may determine the desired timing of actuating the air injector through logic rules that directly take into account parameters such as engine load, engine speed, pre-chamber fuel amount, the desired amount of cooling, etc. In some examples, such as when an injection pressure is fixed, the desired timing is early in the compression stroke (e.g., 20 to 120 degrees before BDC of the compression stroke). Alternatively, the injection pressure may be increased as the engine load increases in order to maintain a constant purge injection timing that is later in the compression stroke. In other examples, a plurality of injections may be performed, such as a first injection within the intake stroke to purge residual gases and a second injection within the compression stroke to mix with fuel for combustion. Still other timings may be used for different operating conditions. For example, when catalyst warming is desired, the desired timing may be within the power stroke, such as within 20 to 50 degrees after TDC of the compression stroke. As yet another example, when pre-chamber temperature control is performed, the desired timing may be within the exhaust stroke of the cylinder. After determining the amount of purge air to be injected and the timing for actuating the air injector, the controller may inject the desired purge air amount by adjusting the pulse-width of an actuation signal sent to the pre-chamber air injector at the determined timing.

At 412, method 400 includes actuating the fuel injector to direct a fuel spray diagonally into the upper chamber portion of the pre-chamber while the purge air is flowing. The controller may adjust the amount of fuel injected into the pre-chamber based on the desired AFR of the pre-chamber, as determined at 408, and the amount of purge air being delivered (e.g., as determined at 412). For example, the controller may input the desired pre-chamber AFR and the amount of purge air being delivered into one or more look-up tables, functions, or maps, which may output a desired fuel amount to inject that will achieve the desired AFR in the pre-chamber. Further, a timing for actuating the fuel injector may be adjusted based on the operating conditions. In general, the fuel spray may be delivered while the purge air is flowing in order to reduce wall wetting on a side of the pre-chamber and increase evaporation of the fuel. The fuel spray is directed across the pre-chamber and impinges on an opposite wall of the pre-chamber (e.g., impingement area 324 shown in FIGS. 3A-3E). By increasing the distance the fuel travels before impinging, the fuel has an increased probability of evaporating before hitting the pre-chamber wall. Purge air is injected near the impingement spot to further increase fuel evaporation, increase mixing of air and fuel, and decrease wall wetting. For example, the purge air may flow across the impingement spot. Thus, the purge air injection timing and the fuel injection timing may occur during overlapping time periods. As an example, the fuel injection may begin after the purge air injection commences and end prior to the purge air injection ceasing.

For example, the controller may refer to a look-up table having the engine speed and load as the input and output a desired timing for actuating the fuel injector to the input engine speed-load. In another example, the controller may determine the desired timing of actuating the fuel injector through logic rules that directly take into account parameters such as engine load, engine speed, pre-chamber temperature, etc. In some examples, fuel may be injected at a similar timing as the air injection (e.g., air and fuel injections overlap) to increase mixing of air and fuel by using the velocity of the air injected. In one example, the controller may inject the desired fuel amount by adjusting the pulse-width of an actuation signal sent to the pre-chamber fuel injector, such as FPW2 shown in FIG. 1, at the determined timing. The injected fuel may mix with the purge air to form an air-fuel mixture with increased charge motion and swirl.

In some examples where the cylinder is operated lean, the active pre-chamber operation may include operating the pre-chamber in the fuel only mode in order to supplement the lean mixture in the pre-chamber, received from the cylinder, with additional fuel in order to reduce an occurrence of pre-chamber misfire (e.g., due to an overly lean pre-chamber AFR) and/or increase a burn rate in the pre-chamber by operating with a slightly rich AFR. In such examples, the desired fuel injection timing may be in a range of 30 to 120 crank angle degrees before TDC of the compression stroke. As another example, when the active pre-chamber operation includes operating in the catalyst warming mode, the desired fuel injection timing may be during the power stroke, between 20 and 50 degrees after TDC of the compression stroke. In still other examples, the desired fuel amount may be zero, such as when the active pre-chamber operation includes operating in the pre-chamber temperature control mode.

At 414, method 400 includes injecting fuel into the cylinder. The controller may adjust an amount of fuel injected into the cylinder based on the desired AFR of the cylinder and an amount of air inducted into the cylinder. For example, the controller may input the desired AFR of the cylinder and an estimated amount of air inducted into the cylinder into one or more look-up tables, functions, or maps stored in memory, which may output the amount of fuel to inject that will achieve the desired AFR in the cylinder.

Further, the injection pressure and timing may be adjusted to increase a burn rate and/or an ignitibility of the air-fuel mixture in the cylinder. For example, the controller may input the desired AFR of the cylinder and engine operating conditions, such as engine load, into one or more look-up tables, functions, and maps, which may output a desired fuel amount to inject that will achieve desired combustion qualities the cylinder. In one example, the controller may inject the desired fuel amount by adjusting a pulse-width of an actuation signal sent to the cylinder fuel injector, such as FPW1 shown in FIG. 1. In some examples, the determined amount of fuel may be injected in a single injection event, while in other examples, the determined amount of fuel may be distributed over a plurality of injection events.

Additionally, the injection timing may influence an amount of fuel that flows into the pre-chamber from the cylinder. For example, a first amount of fuel may be injected just before or during the beginning of the compression stroke, which may increase a fuel concentration in the pre-chamber. The injected fuel may mix with air inducted into the cylinder during the intake stroke to form an air-fuel mixture, a portion of which may be pushed into the pre-chamber during the compression stroke due to a pressure differential between the pre-chamber and the cylinder, as will be elaborated below at 418. The fuel provided to the pre-chamber from the cylinder fuel injection may be in addition to the pre-chamber fuel injection described above at 414. Then, a second amount of fuel may be injected later during the compression stroke to bring the AFR within the cylinder to the desired cylinder AFR. Further, it may be understood that the cylinder may be operated with relatively high EGR compared to when pre-chamber ignition is not used due to the robustness of the flame jets from the pre-chamber igniting dilute mixtures in the cylinder relative to a spark.

At 416, method 400 includes determining a desired pre-chamber spark timing for the pre-chamber firing event. Determining the desired pre-chamber spark timing may include determining when to ignite the air-fuel mixture in the pre-chamber relative to a position of the piston within the cylinder. Although a cylinder spark plug firing induces combustion in a cylinder of a traditional spark-ignition engine, in an engine with pre-chamber ignition, combustion in the pre-chamber induces combustion in the cylinder. Thus, just as cylinder spark timing in the traditional spark-ignition engine may be adjusted relative to the spark timing for maximum brake torque (MBT) based on engine operating conditions, the timing of the pre-chamber firing event may be shifted relative to MBT based on engine operating conditions in order to achieve a desired combustion phasing. For example, the pre-chamber spark timing may be retarded relative to MBT timing to increase an exhaust gas temperature, while the pre-chamber spark timing may be advanced closer to MBT timing to increase a torque output of the cylinder. In one example, the controller may input one or more engine operating conditions (e.g., the engine speed, the engine load, the exhaust gas temperature, the desired pre-chamber AFR, and the desired cylinder AFR) into one or more look-up tables, functions, or maps to determine the desired timing for the pre-chamber firing event. In another example, the controller may make a logical determination (e.g., regarding the pre-chamber spark timing) based on logic rules that are a function of the one or more engine operating conditions.

At 418, method 400 includes flowing gases from the cylinder to the pre-chamber via the pre-chamber orifices during the compression stroke. Due to a pressure within the pre-chamber being less than a pressure of the cylinder because of the piston within the cylinder compressing gases within the cylinder, a portion of the gases within the cylinder may flow into the pre-chamber. The gases may move in the same direction and pattern as the purge air, and the motion of the purge air and the motion of the inflowing gases from the cylinder may reinforce each other, which may enhance the charge motion in the pre-chamber. In this way, residual content within the pre-chamber may be kept at a lower amount than the main chamber for high EGR operations while still creating swirl and tumble flows within the pre-chamber for increased flame speed.

At 420, method 400 includes actuating the pre-chamber spark plug to generate a spark in the pre-chamber. The controller may generate a control signal (e.g., signal SA) that is sent to an ignition system (e.g., ignition system 88 of FIG. 1) to actuate the pre-chamber spark plug at the pre-chamber spark timing determined at 410. The pre-chamber spark plug may be angled (e.g., offset) with respect to a vertical axis of the pre-chamber, as described with respect to FIG. 3D, to take advantage of higher velocities near the edge of the swirling flow of the purge air and evaporated fuel. Generating the spark in the pre-chamber may cause the air-fuel mixture in the pre-chamber to combust, sending jets of hot gas and flame into the cylinder via the pre-chamber orifices.

At 422, method 400 includes igniting the air-fuel mixture in the cylinder via the combustion jets from the pre-chamber orifices. By igniting the air-fuel mixture in the cylinder by using the pre-chamber combustion jets, combustion within the cylinder may occur at a faster rate, increasing an efficiency of the cylinder. Method 400 may end. In some examples, method 400 may run at a pre-determined frequency during nominal engine operation in order to continue reliably provide ignition to the cylinder when cylinder torque is requested.

Returning to 404 in method 300, if active pre-chamber operation is not requested at 404, method 400 proceeds to 406 and includes not injecting air and fuel into the pre-chamber. The controller may not actuate the air injector or the fuel injector. In this way, the pre-chamber may be operated in the passive mode.

Method 400 continues to 414 and includes injecting fuel into the cylinder, as described above. For example, the controller may determine the amount of fuel to inject and the desired injection timing and then actuate the cylinder fuel injector to inject the determined amount of fuel into the cylinder at the desired injection timing.

At 416, method 400 includes determining the desired pre-chamber spark timing, as described above. For example, the desired pre-chamber spark timing may be within the compression stroke near TDC.

At 418, method 400 includes flowing the gases from the cylinder to the pre-chamber via the pre-chamber orifices during the compression stroke, as described above. When air and fuel are not injected directly into the pre-chamber (e.g., during the passive pre-chamber operation mode), the pre-chamber obtains substantially all of its air-fuel mixture from the cylinder as the piston within the cylinder compresses the air-fuel mixture within the cylinder, causing a portion of the air-fuel mixture in the cylinder to flow into the pre-chamber through the pre-chamber orifices.

At 420, method 400 includes actuating the spark plug to generate a spark in the pre-chamber to ignite the air-fuel mixture within the pre-chamber, as described above. For example, the controller may send the spark advance signal to the pre-chamber spark plug to actuate the spark plug and create a spark at the desired timing determined at 416.

At 422, method 400 includes igniting the air-fuel mixture in the cylinder via combustion jets from the pre-chamber orifices, which is further described above. Method 400 may then end.

In this way, mixing and charge motion within the pre-chamber may be increased for providing robust ignition to the cylinder, even at high cylinder dilutions. Specifically, actively injecting both air and fuel into the pre-chamber increases a control and an accuracy of amounts of air and fuel in the pre-chamber relative to passive pre-chamber systems (e.g., pre-chamber systems without active air injection and active fuel injection). Due to the controlled amounts of air and fuel in the pre-chamber and the offset of the spark plug, the pre-chamber may more reliably combust a first air-fuel mixture in the pre-chamber, thus providing an ignition source to a second air-fuel mixture in the cylinder, which may combust in order to provide torque to the engine. The injected air may be directed in the pre-chamber to create a vortex path that sweeps through the injected fuel, creating charge motion within the pre-chamber that may decrease surface wetting and increase fuel evaporation and mixing with the air. The path of the charge motion may create a rich pocket of the first air-fuel mixture proximate to the spark plug for increased rates of combustion. Further, with jets of flame and hot gas used as the cylinder ignition source, the second air-fuel mixture in the cylinder may combust more fully and with a lower peak combustion temperature than using a spark plug as the cylinder ignition source. Thus, by using a pre-chamber ignition system, the second air-fuel mixture in the cylinder may be commanded lean relative to stoichiometry without a reduction in combustion stability and without an increase in $NO_x$ emissions and/or combustion temperatures.

Turning now to FIG. 5, an exemplary timing chart 500 of pre-chamber and cylinder operation is shown. The cylinder may be cylinder 130 of engine 10 in FIG. 1, for example, and may include an active pre-chamber (e.g., pre-chamber 300 of FIGS. 3A-3E). Timing chart 500 shows one combustion cycle, wherein the combustion cycle (e.g., a cylinder cycle) refers to a four stroke movement of a piston of the cylinder. A piston position relative to top dead center (TDC), bottom dead center (BDC), and the four strokes of the combustion cycle (intake, compression, power, and exhaust) is shown in a plot 502. Further, a pre-chamber fuel injection signal is shown in a plot 504, a pre-chamber air injection signal is shown in a plot 506, a spark plug actuation signal is shown in a plot 508, and a cylinder fuel injection signal is shown in a plot 510. For all of the above, the horizontal axis represents engine position (e.g., in crank angle degrees), with the crank angle degrees (CAD) increasing from left to right. The vertical axis represents each labeled parameter. For plot 502, the vertical axis shows the piston position relative to TDC and BDC. For each of plots 504, 506, 508, and 510, an increase in a magnitude of the parameter above zero indicates actuation of the corresponding injector or spark plug. Further, the stroke of the combustion cycle is indicated at the top of timing chart 500, the intake stroke corresponding to the interval from 0 CAD to 180 CAD, the compression stroke corresponding to the interval from 180 CAD to 360 CAD, the power stroke corresponding to the interval from 360 CAD to 540 CAD, and the exhaust stroke corresponding to the interval from 540 CAD to 720 CAD.

During the intake stroke, the exhaust valves close and the intake valves open (not shown). Air is introduced into the cylinder via the intake manifold and the open intake valves, and the piston (plot 502) moves to the bottom of the cylinder so as to increase the volume within the cylinder. The position at which the piston is at its bottom-most position in the cylinder and at the end of its stroke (e.g., when the combustion chamber is at its largest volume) is typically referred to as BDC. Additionally within the intake stroke, fuel injection within the cylinder (plot 510) starts at CAD1. For example, fuel injection may begin around 60 CAD or, in other examples, in a range from 40 to 60 CAD. Fuel is introduced into the cylinder via a cylinder fuel injector (e.g., cylinder fuel injector 66 of FIG. 1), forming an air-fuel mixture with the air inducted into the cylinder during the intake stroke. As shown in plot 510, fuel may be injected into the cylinder in a series of six injections. In other examples, the fuel may be injected in a series of less than six injections or more than six injections. In still other examples, the fuel may be delivered to the cylinder via a single continuous injection. In the example shown, the series of injections occur from CAD1 (e.g., 60 CAD), within the intake stroke, to approximately 270 CAD, within the compression stroke. As such, fuel is injected into the cylinder over a series of injections occurring between 60 and 270 CAD, with most of the fuel delivered during the intake stroke.

During the compression stroke, the intake valves close and the exhaust valves remain closed. The piston (plot 502) moves toward the cylinder head so as to compress the air within the cylinder. The point at which the piston is at the end of its stroke and closest to the cylinder head (e.g., when the combustion chamber is at its smallest volume) is typically referred to as TDC. Within the compression stroke at CAD2, air is injected into the pre-chamber (plot 506) via a pre-chamber air injector (e.g., air injector 394 of FIG. 3A-3E), as described with respect to FIGS. 2A-3E. The injected air may sweep across an inner surface of an upper section of the pre-chamber and create swirl motion in the upper section. Further, because the piston position (plot 502) is relatively low at CAD2, a pressure in the pre-chamber due to the injection may be greater than a pressure in the cylinder. As such, at least a portion of the injected air may flow out of openings in a lower section of the pre-chamber that fluidically couple an internal volume of the pre-chamber and an internal volume of the cylinder, purging residual gases from the pre-chamber to the cylinder in the process.

At CAD3, fuel is injected into the pre-chamber (plot 504) via a pre-chamber fuel injector (e.g., pre-chamber fuel injector 396 of FIG. 3A) and is sprayed diagonally across the pre-chamber, as described with respect to FIGS. 2A-3E. In the example shown, the fuel is injected 30 CAD after the air injection starts. In other examples, the fuel may be injected 0 to 15 CAD or 15 to 30 CAD after air injection within the pre-chamber starts. Further, the air continues to be injected into the pre-chamber at CAD3 (plot 506) to produce an air-fuel mixture in the pre-chamber. By injecting fuel after air injection begins, surface wetting within the pre-chamber may be decreased. Injecting air into the pre-chamber is stopped at CAD4, approximately 10 CAD before fuel injection is stopped. In other examples, fuel injection may be stopped at the same time as the air injection or in a range from 0 to 10 CAD after air injection is stopped within the pre-chamber. In still other examples, the air injection may be stopped after the pre-chamber fuel injection is stopped. In a process referred to herein as ignition, the air-fuel mixture in the pre-chamber is ignited via a spark from a spark plug (e.g., spark plug 392 of FIGS. 3A-3E) coupled to the pre-chamber (plot 508), resulting in pre-chamber combustion. For example, the spark plug may be actuated shortly before TDC at CAD5 of the compression stroke and after the pre-chamber air injection, the pre-chamber fuel injection, and the cylinder fuel injection have occurred.

As the air-fuel mixture in the pre-chamber combusts, jets of flame and hot air flow from the pre-chamber to the cylinder via holes in walls of the pre-chamber, and the jets of flame and hot air ignite the air-fuel mixture in the cylinder. During the power stroke, the expanding gases in the cylinder push the piston (plot 502) back down to BDC. A crankshaft (e.g., crankshaft 140 shown in FIG. 1) converts this piston movement into a rotational torque of the rotary shaft. During the exhaust stroke, the exhaust valves are opened to release the combusted air-fuel mixtures to the corresponding exhaust passages, and the piston returns to TDC.

In this way, air and fuel can be directed within a pre-chamber to increase air and fuel mixing, fuel evaporation, and charge motion, while also decreasing surface wetting and formation of a fuel film within the pre-chamber. By increasing a distance fuel is injected into the pre-chamber before impinging on a pre-chamber interior surface, the fuel may have more time to evaporate within the pre-chamber. Further, by directing air injected by an air injector across the interior surface of the pre-chamber where fuel may impinge, the flowing air may further increase evaporation of the fuel and increase mixing of fuel and air. Further still, the air and/or air-fuel mixture may be directed around the pre-chamber, creating a swirling vortex of charge motion that may form a rich air-fuel pocket at a location of a ground electrode of a spark plug for increased combustion rates.

The technical effect of injecting air in a swirling path into a pre-chamber is to increase air and fuel mixing and decrease wall wetting on a surface of the pre-chamber.

The disclosure also provides support for an engine pre-combustion chamber, comprising: a first chamber portion centered along a first axis, and a second chamber portion joined to the first chamber portion and centered along a second axis that is arranged at an angle to the first axis. In a first example of the system, the second chamber portion includes a cylindrical upper portion capped by a hemispherical lower portion. In a second example of the system, optionally including the first example, a first length of the first chamber portion in a direction of the first axis is less than a second length of the cylindrical upper portion of the second chamber portion in a direction of the second axis. In a third example of the system, optionally including one or both of the first and second examples, a first width of the first chamber portion, perpendicular to the first axis, is greater than a second width of the cylindrical upper portion, perpendicular to the second axis. In a fourth example of the system, optionally including one or more or each of the first through third examples, the hemispherical lower portion comprises a plurality of openings arranged radially with respect to the second axis, the plurality of openings fluidically coupling an internal volume of the engine pre-combustion chamber to an exterior of the engine pre-combustion chamber. In a fifth example of the system, optionally including one or more or each of the first through fourth examples, a sidewall of the first chamber portion is joined to the second chamber portion by a curved joint, and wherein the first chamber portion is fluidically coupled to the second chamber portion at the curved joint. In a sixth example of the system, optionally including one or more or each of the first through fifth examples, an upper surface of the first chamber portion is shaped to receive a spark plug, and wherein the first chamber portion comprises a side extension including a fuel injector coupling port shaped to receive a fuel injector, the side extension angled with respect to the first axis to direct fuel diagonally across the first chamber portion toward an impingement area at an inner surface of the sidewall proximate to the curved joint. In a seventh example of the system, optionally including one or more or each of the first through sixth examples, the system further comprises: an air passage coupled to the first chamber portion at an opening in the sidewall adjacent to the impingement area, and wherein the air passage includes an air injector coupling port shaped to receive an air injector. In an eighth example of the system, optionally including one or more or each of the first through seventh examples, the first chamber portion includes a channel that extends radially outward with respect to the first axis around a portion of a perimeter of the first chamber portion. In a ninth example of the system, optionally including one or more or each of the first through eighth examples, the channel includes an inlet positioned at the opening of the sidewall and an outlet that is vertically and horizontally spaced apart from the inlet. In a tenth example of the system, optionally including one or more or each of the first through ninth examples, the channel arcs toward the upper surface of the first chamber portion and away from the second chamber portion between the inlet and the outlet.

The disclosure also provides support for a system, comprising: an engine including a cylinder, the cylinder including a main combustion chamber with a piston disposed therein, and a pre-chamber positioned in a cylinder head of the cylinder, the pre-chamber comprising a first pre-chamber portion having a first internal volume directly coupled to a second internal volume of a second pre-chamber portion, the first pre-chamber portion positioned further from the piston than the second pre-chamber portion and having a first central axis that is angled differently than a second central axis of the second pre-chamber portion. In a first example of the system, a first length of the first pre-chamber portion partially overlaps with a second length of the second pre-chamber portion, and wherein the second pre-chamber portion is fluidically coupled to the main combustion chamber via a plurality of openings in a bottom surface of the second pre-chamber portion. In a second example of the system, optionally including the first example, the system further comprises: an air injection passage coupled to the first pre-chamber portion at an opening in a sidewall of the first pre-chamber portion proximate to a joint between the first pre-chamber portion and the second pre-chamber portion. In a third example of the system, optionally including one or both of the first and second examples, the first pre-chamber portion further comprises a channel that extends outward around a portion of a perimeter of the first pre-chamber portion, and wherein an inlet of the channel is proximate to the opening in the sidewall of the first pre-chamber portion. In a fourth example of the system, optionally including one or more or each of the first through third examples, the system further comprises: a pre-chamber fuel injector coupled to the first pre-chamber portion and positioned to inject fuel toward an inner surface of the first pre-chamber portion at an area that is proximate to the opening in the sidewall of the first pre-chamber portion. In a fifth example of the system, optionally including one or more or each of the first through fourth examples, the system further comprises: a spark plug coupled to an upper surface of the first pre-chamber portion, and wherein an outlet of the channel is closer to the spark plug than the inlet.

The disclosure also provides support for a method, comprising: injecting fuel into an upper chamber portion of a pre-chamber coupled to a cylinder head of a cylinder toward an impingement area at an internal surface of the upper chamber portion, an angle of the injecting creating a fuel travel distance that is greater than a width of the upper chamber portion of the pre-chamber, and flowing air across the impingement area during the injecting. In a first example of the method, the impingement area is proximate to an opening fluidically coupling the upper chamber portion to an air delivery passage, and wherein flowing the air across the impingement area during the injecting comprises actuating an air injector coupled to the air delivery passage. In a second example of the method, optionally including the first example, the method further comprises: actuating a spark plug coupled to the upper chamber portion after the injecting to initiate combustion of the air and the fuel, and flowing flame jets produced by the combustion to the cylinder via a plurality of openings between the cylinder and a lower chamber portion that is directly fluidically coupled to the upper chamber portion, the lower chamber portion having a different central axis than the upper chamber portion.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine pre-combustion chamber, comprising:
a first pre-chamber portion centered along a first axis; and
a second pre-chamber portion joined to the first pre-chamber portion and centered along a second axis that is arranged at an angle to the first axis.

2. The engine pre-combustion chamber of claim 1, wherein the second pre-chamber portion includes a cylindrical upper portion capped by a hemispherical lower portion.

3. The engine pre-combustion chamber of claim 2, wherein a first length of the first pre-chamber portion in a direction of the first axis is less than a second length of the cylindrical upper portion of the second pre-chamber portion in a direction of the second axis.

4. The engine pre-combustion chamber of claim 2, wherein a first width of the first pre-chamber portion, perpendicular to the first axis, is greater than a second width of the cylindrical upper portion, perpendicular to the second axis.

5. The engine pre-combustion chamber of claim 2, wherein the hemispherical lower portion comprises a plurality of openings arranged radially with respect to the second axis, the plurality of openings fluidically coupling an internal volume of the engine pre-combustion chamber to an exterior of the engine pre-combustion chamber.

6. The engine pre-combustion chamber of claim 1, wherein a sidewall of the first pre-chamber portion is joined to the second pre-chamber portion by a curved joint, and wherein the first pre-chamber portion is fluidically coupled to the second pre-chamber portion at the curved joint.

7. The engine pre-combustion chamber of claim 6, wherein an upper surface of the first pre-chamber portion is shaped to receive a spark plug, and wherein the first pre-chamber portion comprises a side extension including a fuel injector coupling port shaped to receive a fuel injector, the side extension angled with respect to the first axis to direct fuel diagonally across the first pre-chamber portion toward an impingement area at an inner surface of the sidewall proximate to the curved joint.

8. The engine pre-combustion chamber of claim 7, further comprising an air passage coupled to the first pre-chamber portion at an opening in the sidewall adjacent to the impingement area, and wherein the air passage includes an air injector coupling port shaped to receive an air injector.

9. The engine pre-combustion chamber of claim 8, wherein the first pre-chamber portion includes a channel that extends radially outward with respect to the first axis around a portion of a perimeter of the first pre-chamber portion.

10. The engine pre-combustion chamber of claim 9, wherein the channel includes an inlet positioned at the opening of the sidewall and an outlet that is vertically and horizontally spaced apart from the inlet.

11. The engine pre-combustion chamber of claim 10, wherein the channel arcs toward the upper surface of the first pre-chamber portion and away from the second pre-chamber portion between the inlet and the outlet.

12. A system, comprising:
an engine including a cylinder, the cylinder including a main combustion chamber with a piston disposed therein; and
a pre-chamber positioned in a cylinder head of the cylinder, the pre-chamber comprising a first pre-chamber portion having a first internal volume directly coupled to a second internal volume of a second pre-chamber portion, the first pre-chamber portion positioned further from the piston than the second pre-chamber portion and having a first central axis that is angled differently than a second central axis of the second pre-chamber portion.

13. The system of claim 12, wherein a first length of the first pre-chamber portion partially overlaps with a second length of the second pre-chamber portion, and wherein the second pre-chamber portion is fluidically coupled to the main combustion chamber via a plurality of openings in a bottom surface of the second pre-chamber portion.

14. The system of claim 12, further comprising an air injection passage coupled to the first pre-chamber portion at an opening in a sidewall of the first pre-chamber portion proximate to a joint between the first pre-chamber portion and the second pre-chamber portion.

15. The system of claim 14, wherein the first pre-chamber portion further comprises a channel that extends outward around a portion of a perimeter of the first pre-chamber portion, and wherein an inlet of the channel is proximate to the opening in the sidewall of the first pre-chamber portion.

16. The system of claim 14, further comprising a pre-chamber fuel injector coupled to the first pre-chamber portion and positioned to inject fuel toward an inner surface of the first pre-chamber portion at an area that is proximate to the opening in the sidewall of the first pre-chamber portion.

17. The system of claim 15, further comprising a spark plug coupled to an upper surface of the first pre-chamber portion, and wherein an outlet of the channel is closer to the spark plug than the inlet.

* * * * *

UNITED STATES PATENT AND TRADEMARK OFFICE
CERTIFICATE OF CORRECTION

| | | |
|---|---|---|
| PATENT NO. | : 11,319,866 B1 | |
| APPLICATION NO. | : 17/303563 | |
| DATED | : May 3, 2022 | |
| INVENTOR(S) | : Brad VanDerWege and Claudia Iyer | |

It is certified that error appears in the above-identified patent and that said Letters Patent is hereby corrected as shown below:

In the Specification

Column 1 Line 4:
Add "This material is based upon work supported by the U.S. Department of Energy under Award Number DE-EE0008878. The government has certain rights in the invention.", under the title.

Signed and Sealed this
Ninth Day of May, 2023

Katherine Kelly Vidal
*Director of the United States Patent and Trademark Office*